United States Patent
Dornemann et al.

(10) Patent No.: US 10,949,240 B2
(45) Date of Patent: *Mar. 16, 2021

(54) LIVE SYNCHRONIZATION AND MANAGEMENT OF VIRTUAL MACHINES ACROSS COMPUTING AND VIRTUALIZATION PLATFORMS AND USING LIVE SYNCHRONIZATION TO SUPPORT DISASTER RECOVERY

(71) Applicant: Commvault Systems, Inc., Tinton Falls, NJ (US)

(72) Inventors: Henry Wallace Dornemann, Eatontown, NJ (US); Ajay Venkat Nagrale, Tinton Falls, NJ (US); Rahul S. Pawar, Marlboro, NJ (US); Ananda Venkatesha, Cupertino, CA (US)

(73) Assignee: Commvault Systems, Inc., Tinton Falls, NJ (US)

(*) Notice: Subject to any disclaimer, the term of this patent is extended or adjusted under 35 U.S.C. 154(b) by 237 days.

This patent is subject to a terminal disclaimer.

(21) Appl. No.: 16/234,987

(22) Filed: Dec. 28, 2018

(65) Prior Publication Data
US 2019/0138342 A1 May 9, 2019

Related U.S. Application Data

(63) Continuation of application No. 15/365,756, filed on Nov. 30, 2016, now Pat. No. 10,228,962.
(Continued)

(51) Int. Cl.
*G06F 9/455* (2018.01)
*G06F 11/20* (2006.01)
*G06F 11/14* (2006.01)

(52) U.S. Cl.
CPC ...... *G06F 9/45558* (2013.01); *G06F 11/2038* (2013.01); *G06F 11/2048* (2013.01);
(Continued)

(58) Field of Classification Search
CPC .......... G06F 9/45558; G06F 11/2038; G06F 11/2048; G06F 11/2097; G06F 11/4146; G06F 2201/815; G06F 2009/45583
See application file for complete search history.

(56) References Cited

U.S. PATENT DOCUMENTS

| 4,084,231 A | 4/1978 | Capozzi et al. |
| 4,267,568 A | 5/1981 | Dechant et al. |
(Continued)

FOREIGN PATENT DOCUMENTS

| EP | 0259912 | 3/1988 |
| EP | 0405926 | 1/1991 |
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Lewis A Bullock, Jr.
*Assistant Examiner* — Kevin X Lu
(74) *Attorney, Agent, or Firm* — Commvault Systems, Inc.

(57) ABSTRACT

An illustrative "Live Synchronization" feature in a data storage management system can reduce the downtime that arises in failover situations. The illustrative Live Sync embodiment uses backup data to create and maintain a ready (or "warm") virtualized computing platform comprising one or more virtual machines ("VMs") that are configured and ready to be activated and take over data processing from another data processing platform operating in the production
(Continued)

environment. The "warm" computing platform awaits activation as a failover solution for the production system(s) and can be co-located at the production data center, or configured at a remote or disaster recovery site, which in some embodiments is configured "in the cloud." Both local and remote illustrative embodiments are discussed herein. An "incremental forever" approach can be combined with deduplication and synthetic full backups to speed up data transfer and update the disaster recovery sites.

19 Claims, 17 Drawing Sheets

Related U.S. Application Data

(60) Provisional application No. 62/265,339, filed on Dec. 9, 2015.

(52) U.S. Cl.
CPC ...... *G06F 11/2097* (2013.01); *G06F 11/1446* (2013.01); *G06F 2009/45583* (2013.01); *G06F 2201/815* (2013.01)

(56) References Cited

U.S. PATENT DOCUMENTS

| | | | |
|---|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiftler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,477,663 B1 | 11/2002 | Laranjeira et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,749 B2 | 11/2009 | Flynn, Jr. et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,725,893 B2 | 5/2010 | Jaeckel et al. |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,078,910 B1 | 12/2011 | Backensto et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,954,446 B2 | 2/2015 | Vijayan Retnamma et al. |
| 9,020,900 B2 | 4/2015 | Vijayan Retnamma et al. |
| 9,098,495 B2 | 8/2015 | Gokhale |
| 9,146,755 B2 * | 9/2015 | Lassonde ............ G06F 9/44505 |
| 9,223,597 B2 * | 12/2015 | Deshpande ............ G06F 9/455 |
| 9,239,687 B2 | 1/2016 | Vijayan et al. |
| 9,286,110 B2 | 3/2016 | Mitkar et al. |
| 9,292,350 B1 * | 3/2016 | Pendharkar ............ G06F 9/5044 |
| 9,311,121 B2 | 4/2016 | Deshpande et al. |
| 9,417,968 B2 | 8/2016 | Dornemann et al. |
| 9,436,555 B2 | 9/2016 | Dornemann et al. |
| 9,495,404 B2 | 11/2016 | Kumarasamy et al. |
| 9,639,274 B2 | 5/2017 | Maranna et al. |
| 9,710,465 B2 | 7/2017 | Dornemann et al. |
| 9,740,702 B2 | 8/2017 | Pawar et al. |
| 9,766,825 B2 | 9/2017 | Bhagi |
| 9,983,936 B2 | 5/2018 | Dornemann et al. |
| 10,228,962 B2 | 3/2019 | Dornemann et al. |
| 10,310,953 B2 | 6/2019 | Vijayan et al. |
| 10,387,266 B2 | 8/2019 | Kumarasamy et al. |
| 2004/0230899 A1 * | 11/2004 | Pagnano ............ G06F 16/88 715/205 |
| 2005/0022213 A1 | 1/2005 | Yamagami |
| 2005/0251785 A1 | 11/2005 | Vertes et al. |
| 2006/0224846 A1 | 10/2006 | Amarendran et al. |
| 2009/0313447 A1 | 12/2009 | Nguyen et al. |
| 2009/0319534 A1 | 12/2009 | Gokhale |
| 2012/0084769 A1 * | 4/2012 | Adi ............ G06F 8/63 717/174 |
| 2012/0144232 A1 | 6/2012 | Griffith et al. |
| 2012/0150818 A1 | 6/2012 | Vijayan Retnamma et al. |
| 2012/0150826 A1 | 6/2012 | Vijayan Retnamma et al. |
| 2012/0266170 A1 * | 10/2012 | Zimmerman ....... G06F 9/45558 718/1 |
| 2012/0310894 A1 | 12/2012 | Freedman et al. |
| 2014/0053022 A1 * | 2/2014 | Forgette ............ G06F 11/1469 714/21 |
| 2014/0115285 A1 * | 4/2014 | Arcese ............ G06F 9/45533 711/162 |
| 2014/0196038 A1 | 7/2014 | Kottomtharayil et al. |
| 2014/0201157 A1 | 7/2014 | Pawar et al. |
| 2014/0201170 A1 | 7/2014 | Vijayan et al. |
| 2015/0074536 A1 | 3/2015 | Varadharajan et al. |
| 2016/0019317 A1 | 1/2016 | Pawar et al. |
| 2016/0041880 A1 | 2/2016 | Mitkar et al. |
| 2016/0085636 A1 | 3/2016 | Dornemann et al. |

(56) References Cited

U.S. PATENT DOCUMENTS

| | | | |
|---|---|---|---|
| 2016/0132400 A1* | 5/2016 | Pawar | G06F 11/1458 707/679 |
| 2016/0350391 A1 | 12/2016 | Vijayan et al. | |
| 2017/0024152 A1 | 1/2017 | Bhagi et al. | |
| 2017/0090972 A1* | 3/2017 | Ryu | G06F 9/45558 |
| 2017/0168903 A1 | 6/2017 | Dornemann et al. | |
| 2017/0185488 A1 | 6/2017 | Kumarasamy et al. | |
| 2017/0193003 A1 | 7/2017 | Vijayan et al. | |
| 2017/0235647 A1 | 8/2017 | Kilaru et al. | |
| 2017/0242871 A1 | 8/2017 | Kilaru et al. | |
| 2017/0262204 A1 | 9/2017 | Dornemann et al. | |
| 2018/0095846 A1 | 4/2018 | Sanakkayala et al. | |
| 2018/0113625 A1 | 4/2018 | Sancheti et al. | |
| 2019/0266054 A1 | 8/2019 | Kumarasamy et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

\* cited by examiner

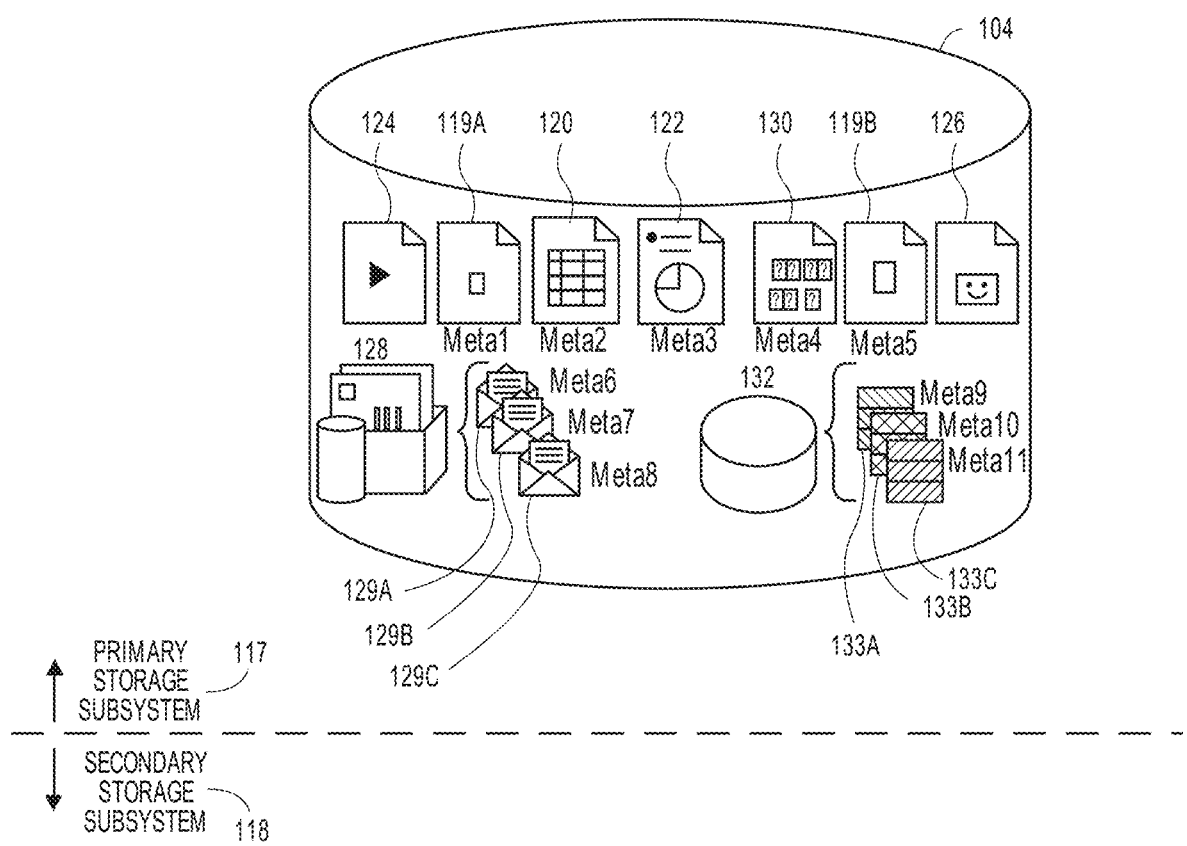
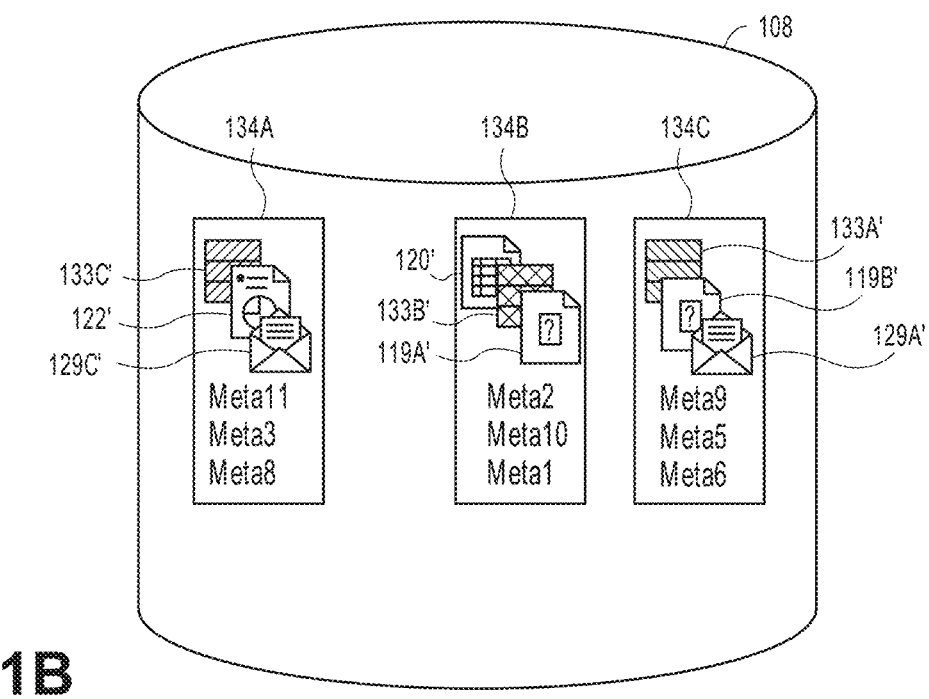
FIG. 1B

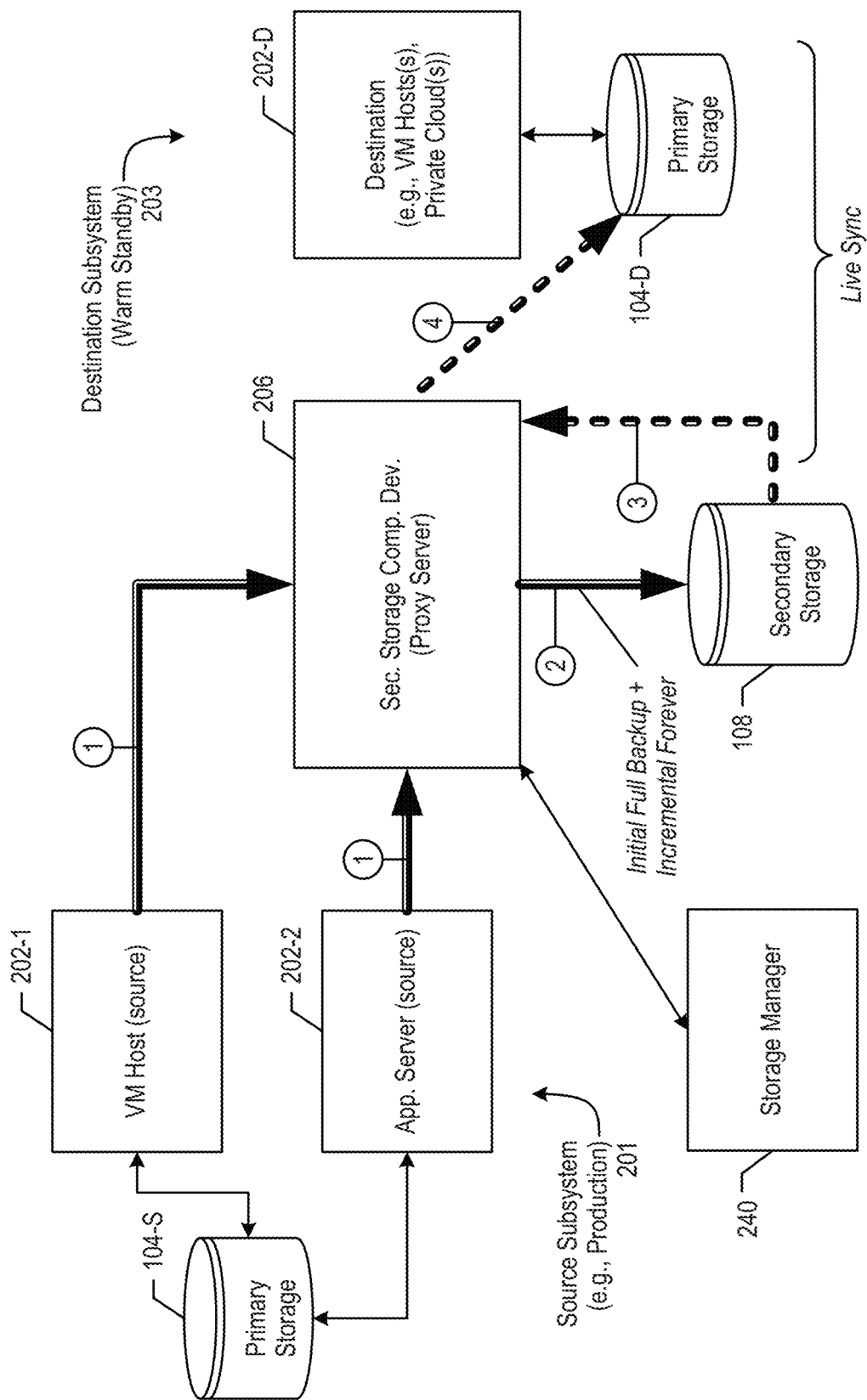
FIG. 2A  System 200 For Live Synchronization And Management Of Virtual Machines Across Computing And Virtualization Platforms And For Using Live Synchronization To Support Disaster Recovery – Co-Located Recovery Destination

FIG. 4 (CO-LOCATED DESTINATION)

FIG. 5 (REMOTE DESTINATION)

LIVE SYNCHRONIZATION AND MANAGEMENT OF VIRTUAL MACHINES ACROSS COMPUTING AND VIRTUALIZATION PLATFORMS AND USING LIVE SYNCHRONIZATION TO SUPPORT DISASTER RECOVERY

INCORPORATION BY REFERENCE TO ANY PRIORITY APPLICATIONS

The present application is a Continuation of U.S. patent application Ser. No. 15/365,756 filed on Nov. 30, 2016, which claims priority to U.S. Provisional Patent Application Ser. No. 62/265,339, filed on Dec. 9, 2015, and entitled "Live Synchronization and Management of Virtual Machines across Computing and Virtualization Platforms and Using Live Synchronization to Support Disaster Recovery." Any and all applications for which a foreign or domestic priority claim is identified in the Application Data Sheet of the present application are hereby incorporated by reference herein under 37 CFR 1.57. Furthermore, U.S. Provisional Patent Application Ser. No. 62/387,384, having a filing date of Dec. 23, 2015 and the title of "Application-Level Live Synchronization across Computing Platforms Including Synchronizing Co-Resident Applications to Disparate Standby Destinations and Selectively Synchronizing Some Applications and Not Others" is also hereby incorporated by reference herein.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc.

One common problem encountered with recovering data after a catastrophic failure in a production system is that re-starting at a failover destination requires restoring data to the failover system. Restore operations can take a very long time when large amounts of data need to be restored.

SUMMARY

An illustrative "Live Synchronization" (or "Live Sync" or "LiveSync") feature in a data storage management system can overcome these obstacles and significantly reduce the downtime that arises in failover situations. Live Sync uses backup data to create and maintain a ready (or "warm") virtualized computing platform comprising one or more virtual machines (or "VMs") that are configured and ready to be activated and take over data processing from another data processing platform operating in the production environment. The "warm" computing platform awaits activation as a failover solution for the production system(s) and can be co-located at the production data center, or configured at a remote or disaster recovery site, which in some embodiments is configured "in the cloud." Both local and remote illustrative embodiments are discussed herein. For convenience, the production environment is referred to herein as the "source," and the failover system(s) are referred to as the "destination(s)."

Live Sync uses backup data to create and maintain destination site(s) in a warm standby state. With backup and replication from a single pass against source virtual machines, Live Sync minimizes the impact of replication on source applications. An "incremental forever" approach, combined with deduplication and synthetic full backups, enables fast data transfer and updates to remote destination(s) which can be used as disaster recovery sites. By using backup data and performing replication using backup infrastructure, Live Sync minimizes the impact on production systems. Live Sync uses a full or synthetic full backup to create each destination VM and updates destination VMs from subsequent incremental backups of the source VMs. Live Sync schedules are configurable to create multiple Live Sync jobs for each schedule, with each job using its own stream for a subset of virtual machines; this approach dramatically reduces the amount of time required to replicate large numbers of virtual machines. In the event of a disaster, the illustrative Live Sync systems power on the destination VMs for minimal disruption of vital business applications. Other storage operations are also available to recover less critical virtual machines from backups as needed.

The Live Sync feature enables incremental replication from a backup of a virtual machine (source VM) to a synchronized copy of the virtual machine (destination VM). The Live Sync operation opens the destination VM and applies changes from the source VM backups since the last synchronization point. Replication of virtual machines to VMWARE vCenter or to VMWARE vCloud is possible in some of the illustrative embodiments. When replicating to vCloud, administrators can choose the organization, virtual data center (vDC), vApp name, and vApp owner. Other public, private, and/or hybrid cloud destinations also are contemplated. The Live Sync feature can initiate replication automatically after backups or on a scheduled basis (for example, daily or weekly), without requiring additional action from administrators/users. Using backup data for replications minimizes the impact on the production workload by avoiding the need to read the source VM again for replication. In addition, in cases where corruption on the source VM is replicated to the destination VM, users can still recover an earlier point-in-time version of the source VM from older backups. If no new backups have been run since the last Live Sync, the scheduled Live Sync does not run. Live Sync can be used to create and maintain warm recovery sites for virtual machines running critical business applications. The advantages of Live Sync include without limitation: (a) the impact on production servers is minimized because Live Sync uses backup data to create replicated virtual machines; backup captures virtual machine data in a single pass, and Live Sync runs on backup infrastructure; (b)

Live Sync is hardware agnostic; there is no need to reproduce the original hardware environment at the recovery site; (c) The recovery time objective (RTO), the time interval between a service interruption and the restoration of services from the recovery site, is the time needed to power on the virtual machines at the destination site; (d) automated validation and the ability to specify new network connections at the recovery site ensure that startup time is minimized; (e) the recovery point objective (RPO), the acceptable time interval within which virtual machine data must be recoverable, is determined by the frequency of backups; (f) backup data can be copied to a remote location where Live Sync operations are performed; deduplication and compression reduce the amount of data that needs to be transferred over wide area network(s) (WAN).

The VMs at the destination are configured, but do not execute until activated (or "powered up"), which occurs on detecting a failure in the production environment or on demand, which is invoked by a user and/or by an illustrative storage manager that is responsible for managing the data storage management system. The production environment comprises physical computing devices and/or VMs and executes in one or more of a private, public, and/or cloud-based data center.

A novel "incremental forever" approach enables fast data transfer and updates to be deployed to any number and types of destination recovery sites. An initial full backup of the source is followed by any number of incremental backups that are applied to the destination(s) on an ongoing basis without further need for a full backup of the source—hence "incremental forever."

The Live Sync destination platform need not be the same kind of technology as the source. The source can be physical (e.g., an application host server) and/or virtualized (e.g., a VM host or cloud computing environment using a certain hypervisor). The destination is preferably virtualized according to the illustrative embodiment and uses the same kind of hypervisor, though in alternative embodiments a different kind of hypervisor is possible. Thus, the failover site is one or more VMs (in a data center or deployed in the cloud) configured to be a warm standby able to take over production data processing as needed.

In general, a source production machine (be it physical or VM) is first subjected to a full backup, e.g., backing up an entire storage disk, logical disk, and/or logical volume that serves the source production machine. The backup is then used for configuring a corresponding destination VM, which is generally configured to substantially similar parameters such as CPU characteristics, main memory (RAM) amount, similarly sized and attached primary storage (e.g., similar parameters for how the primary storage is attached to the source production machine, e.g., protocol, slot, etc.). The destination primary storage device stores data, metadata, and other configuration information restored from the backup copy. Afterwards, the source is incrementally backed up on a regular basis, e.g., hourly. The incremental backups (usually the set of changed data blocks and/or other changed data since the preceding backup) are then immediately (or on a delayed schedule) applied to the destination VM, e.g., updating the data blocks in the destination primary storage according to the changes in the incremental backups from the source.

In some embodiments, incremental backups are not immediately applied, and instead several incremental backups are allowed to accumulate before being applied to the destination VM. For example, incremental backups that occur hourly may accumulate over the course of a day and be synchronized to the destination VM daily. In such a scenario, it is preferable to consolidate the changes before applying them. Illustratively, the multiple incremental backups are analyzed at the source location (e.g., by a media agent) and only the most current changed data are transmitted to the destination (e.g., another media agent) and applied to the destination VM. In other words, rather than "replaying" each incremental backup in turn, only the minimum set of changes is applied to the destination VM, thereby reducing churn. In some embodiments the consolidation occurs at the destination. The incremental backups are still retained in secondary storage (e.g., at the source and/or destination sites) as point-in-time backup copies in case the source or destination needs to revert to a certain known good state from an earlier point in time. This might be required if a test of the destination VM reveals a boot failure or some other data corruption. In such a case, when the destination VM is activated for taking over from the source production machine, it would begin operating with data from the earlier known good point in time rather than using the latest incremental backup.

In the illustrative embodiment, an enhanced data agent associated with the source computing platform intelligently captures information about the source configuration along with VM data being backed up (e.g., VMDK file(s)). The source configuration information will be used at the destination to generate and configure a VM that substantially resembles the configuration at the source, e.g., CPU characteristics, main memory (RAM) amount, similarly sized and attached primary storage (e.g., similar parameters for how the primary storage is attached to the source production machine, e.g., protocol, slot, etc.). The initial full backup copy comprises source configuration parameters discovered by the enhanced data agent involved in the initial full backup operation. The discovered configuration parameters are converted by the data agent into a hypervisor-independent format and are incorporated into the initial full backup copy. At the destination, another enhanced data agent interprets the configuration parameters and configures a destination VM that both resembles the source computing platform (physical or virtualized) and also is suitable for being managed by the destination's hypervisor, e.g., Amazon AWS, Microsoft Azure, VMWARE vCloud, etc., regardless of the type of VM hypervisor (if any) at the source. The destination enhanced data agent also is responsible for applying the backups to the destination VM(s) by taking part in restoring the initial full backup and the ongoing incremental backup copies. A destination enhanced data agent maintains the destination VM in a configured state and its primary storage current with incremental backups from the source, ready to take over from the source production environment if need be but not actually executing (i.e., "warm" or "warm standby"). When the destination data agent detects or infers that the source has failed (or on demand), it activates the warm standby VM, which begins executing over the destination hypervisor. The powered-on destination VM accesses its primary storage for the live-synched data therein and begins to execute corresponding copies/versions of whatever applications were executing at the source. The downtime for switching over from source to destination is substantially less than restoring the several outstanding backups after detecting the failure at the source (or on demand). Instead, according to the illustrative embodiment, the destination VM is ready to take over substantially immediately and has information sufficient to begin processing data from its own associated primary storage which has been kept "live-synced" throughout.

Thus, a production computing environment may flexibly and efficiently fail over, with minimal downtime and with relatively up-to-date data, to a cloud-based disaster recovery site as needed, using a suitable virtualized environment operating in the cloud or elsewhere apart from the failed production site. The disaster recovery environment can then be reverse synchronized to the source computing environment when the source is ready ("failback"), e.g., after repairs have been implemented or after the catastrophic failure has passed.

The destination disaster recovery platform can be tested in a verification scenario by activating ("powering up") destination VMs in test mode without affecting the source and without "taking over" from the production environment. Tests can be conducted at the disaster recovery site as often as desired. The tests are useful for verifying that the "warm standby" state is healthy and ready to take over if need be. For example, the VM is booted and executes test scripts against its primary data, which has been live-synched, to pass certain health checks. After the test passes, the destination VM is de-activated ("powered down") and remains as a warm standby ready to take over when needed.

As noted, the illustrative system is not limited to VM-to-VM live synchronization. Physical-to-VM Live Sync is also possible using some of the same principles employed in the VM-to-VM scenarios, such as capturing relevant configuration information about the source, converting source configuration information into a suitable virtualized analogue, and executing recovery operations across technology platforms. A substantial amount of intelligence is implemented in the illustrative data agents, both at source and destination, to capture appropriate configuration information and configure the destination VMs and their associated primary storage to properly resemble the hardware configurations in the production environment at the source.

The illustrative system automatically detects problems at the source and activates the failover/disaster recovery scenario. Illustrative schemes include monitoring features and methods for activating VMs in certain sequences that are desirable to the computing environment with an objective of making the failover systems take over as seamlessly as possible. In some alternative embodiments, the failure conditions are detected or inferred by a storage manager and/or the destination data agent (e.g., through loss of communications with the source) and failover operations are initiated therefrom.

BRIEF DESCRIPTION OF THE DRAWINGS

FIG. 1B is a detailed view of a primary storage device, a secondary storage device, and some examples of primary data and secondary copy data.

FIG. 2A is a block diagram of an illustrative system 200 for live synchronization and management of virtual machines across computing and virtualization platforms and for using live synchronization to support disaster recovery to a co-located recovery destination, according to an illustrative embodiment of the present invention.

DETAILED DESCRIPTION

Descriptions and examples of systems and methods according to one or more illustrative embodiments of the present invention may be found in the section entitled LIVE SYNCHRONIZATION AND MANAGEMENT OF VIRTUAL MACHINES ACROSS COMPUTING AND VIRTUALIZATION PLATFORMS AND USING LIVE SYNCHRONIZATION TO SUPPORT DISASTER RECOVERY, as well as in FIGS. 2A-10 and in the section entitled Example Embodiments. Furthermore, components and functionality for Live Sync may be configured, combined, and/or incorporated into information management systems such as those described herein in FIGS. 1A-1H.

Various embodiments described herein are intimately tied to, enabled by, and would not exist except for, computer technology. For example, performing full and incremental backups, generating virtual machines from backups, and maintaining virtual machines synchronized with source computing platforms and backups thereof as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
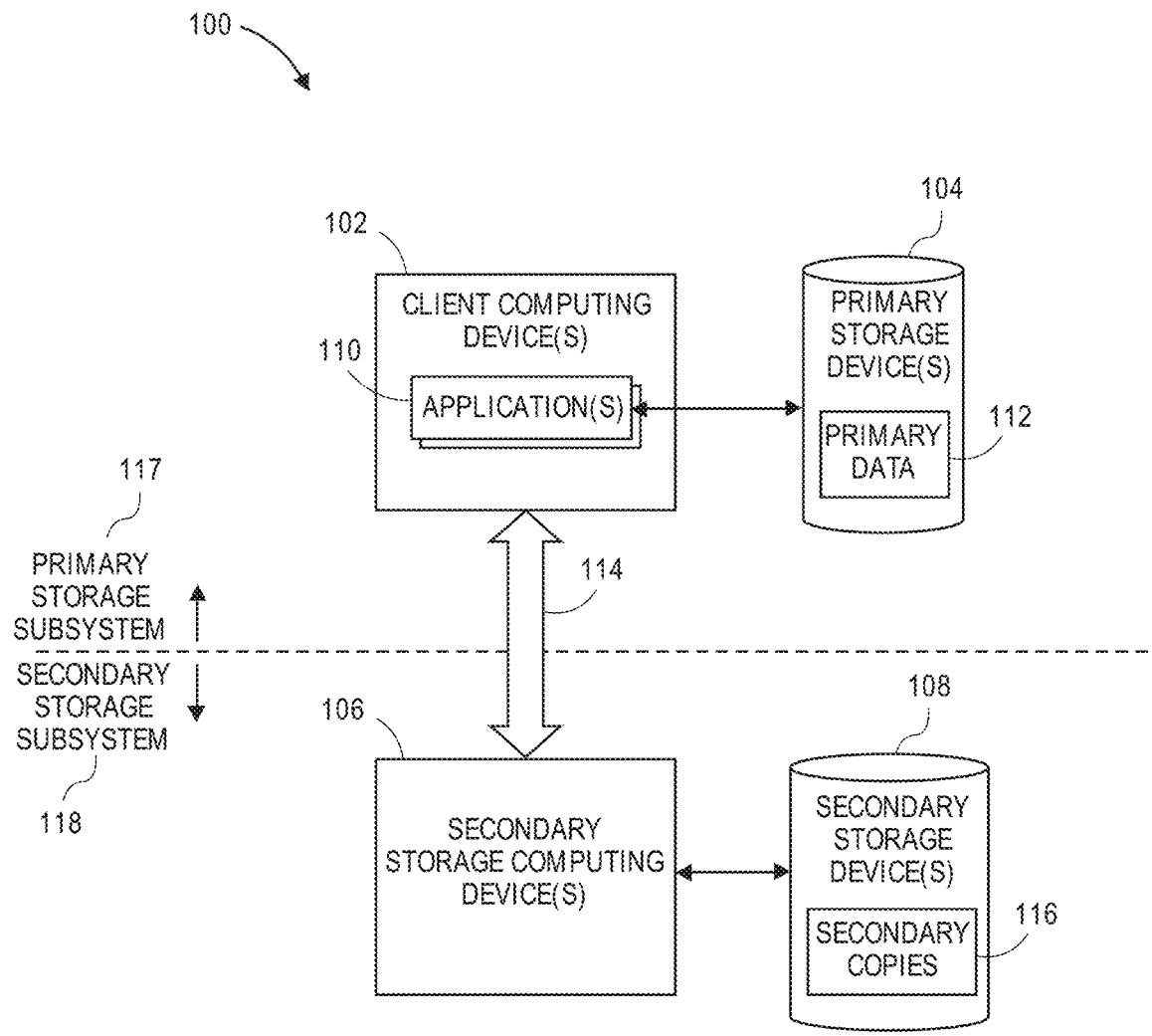
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" and the operations it performs may be referred to as "information management operations" or "storage operations" in some circumstances. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";
- U.S. Pat. No. 9,417,968, entitled "Efficiently Restoring Execution of a Backed Up Virtual Machine based on Coordination with Virtual-Machine-File-Relocation Operations";
- U.S. Pat. No. 9,436,555 entitled "Efficient Live-Mount of a Backed Up Virtual Machine in a Storage Management System";
- U.S. Pat. Pub. No. 2006/0224846, entitled "System and Method to Support Single Instance Storage Operations";
- U.S. Pat. Pub. No. 2014/0201170, entitled "High Availability Distributed Deduplicated Storage System";
- U.S. Pat. Pub. No. 2016/0085636, entitled "Efficiently Restoring Execution of a Backed Up Virtual Machine based on Coordination with Virtual-Machine-File-Relocation Operations";
- U.S. patent application Ser. No. 14/721,971, entitled "Replication Using Deduplicated Secondary Copy Data";
- U.S. patent application Ser. No. 14/805,615, entitled "Browse and Restore for Block-Level Backups";
- U.S. Patent Application No. 62/273,286 entitled "Redundant and Robust Distributed Deduplication Data Storage System";
- U.S. Patent Application No. 62/294,920, entitled "Data Protection Operations Based on Network Path Information";
- U.S. Patent Application No. 62/297,057, entitled "Data Restoration Operations Based on Network Path Information";
- U.S. Patent Application Ser. No. 62/305,919, filed on Mar. 9, 2016, entitled "Using Hypervisor-Independent Block-Level Live Browse to Directly Access Backed Up Virtual Machine (VM) Data and Perform Hypervisor-Free File-Level Recovery (Block-Level Pseudo-Mount)";
- U.S. Patent Application Ser. No. 62/387,384, filed on Dec. 23, 2015, entitled "Application-Level Live Synchronization Across Computing Platforms Including Synchronizing Co-Resident Applications To Disparate Standby Destinations And Selectively Synchronizing Some Applications And Not Others";
- U.S. Patent Application Ser. No. 62/402,269, filed Oct. 17, 2016 and entitled "Heartbeat Monitoring of Virtual Machines for Initiating Failover Operations in a Data Storage Management System".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
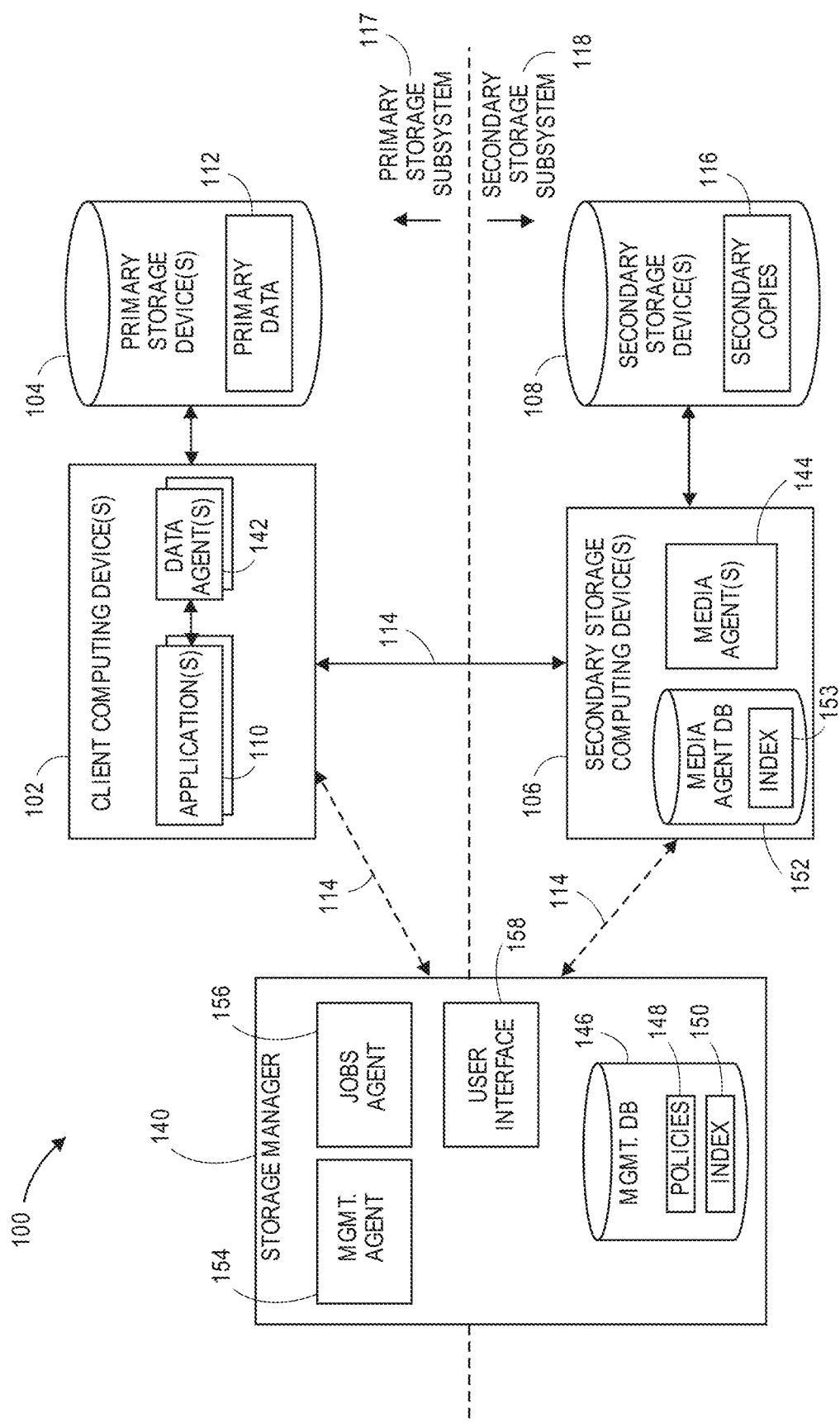
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta11, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
  communicating with data agents 142 and media agents 144, including transmitting instructions, messages, and/or queries, as well as receiving status reports, index information, messages, and/or queries, and responding to same;
  initiating execution of information management operations;
  initiating restore and recovery operations;
  managing secondary storage devices 108 and inventory/capacity of the same;
  allocating secondary storage devices 108 for secondary copy operations;
  reporting, searching, and/or classification of data in system 100;
  monitoring completion of and status reporting related to information management operations and jobs;
  tracking movement of data within system 100;
  tracking age information relating to secondary copies 116, secondary storage devices 108, comparing the age information against retention guidelines, and initiating data pruning when appropriate;
  tracking logical associations between components in system 100;
  protecting metadata associated with system 100, e.g., in management database 146;
  implementing job management, schedule management, event management, alert management, reporting, job history maintenance, user security management, disaster recovery management, and/or user interfacing for system administrators and/or end users of system 100;
  sending, searching, and/or viewing of log files; and
  implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
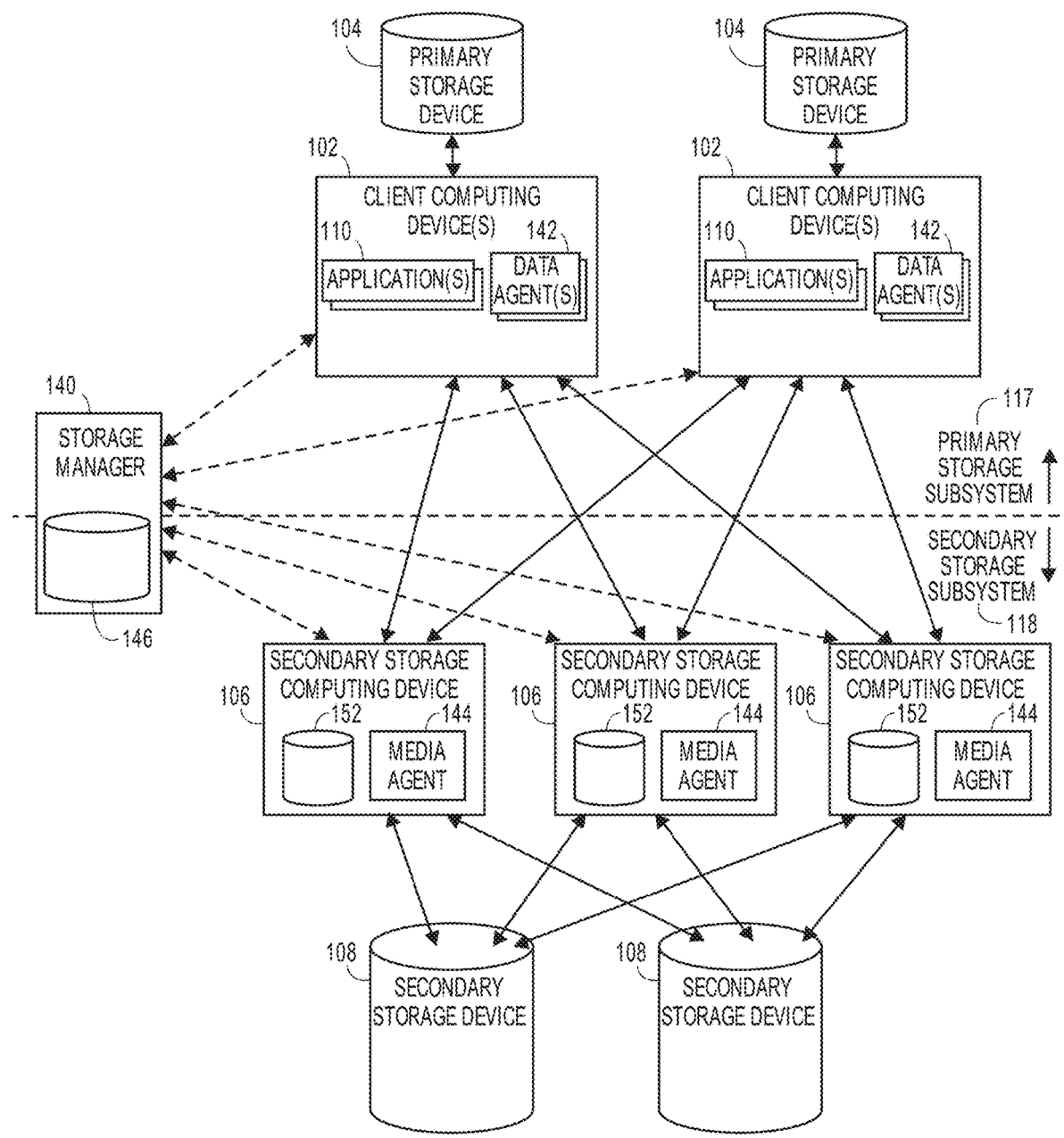
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
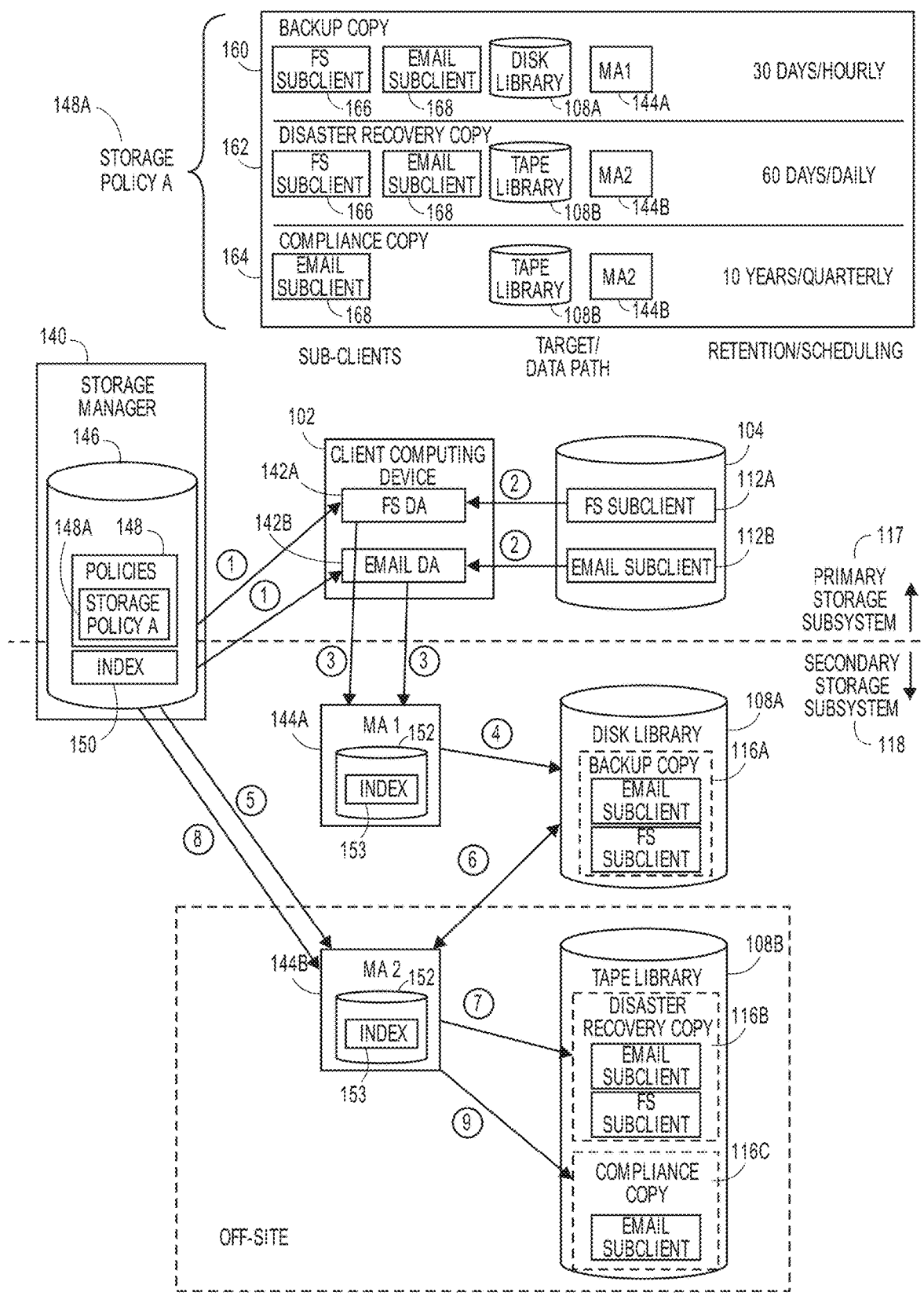
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage
Policies—Information Governance Policies and
Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
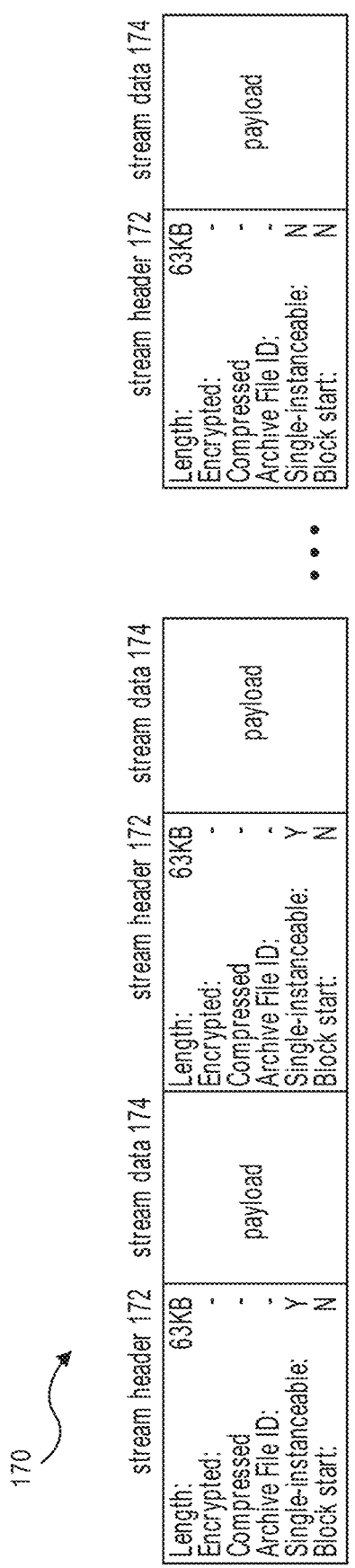
FIGS. 1F-1H are block diagrams illustrating suitable data structures that may be employed by the information management system.
Figure 1G:
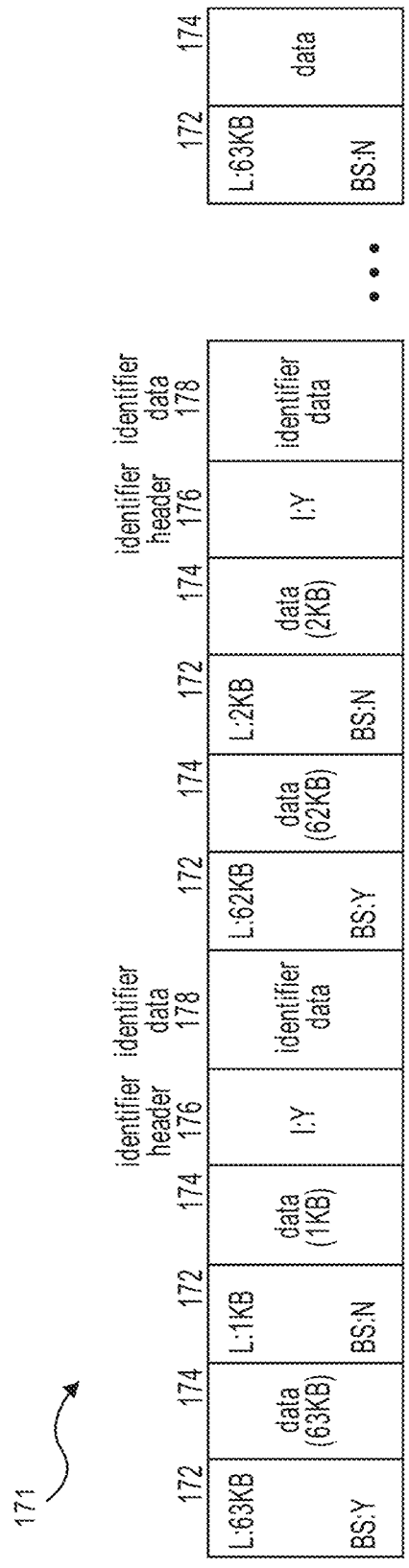

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
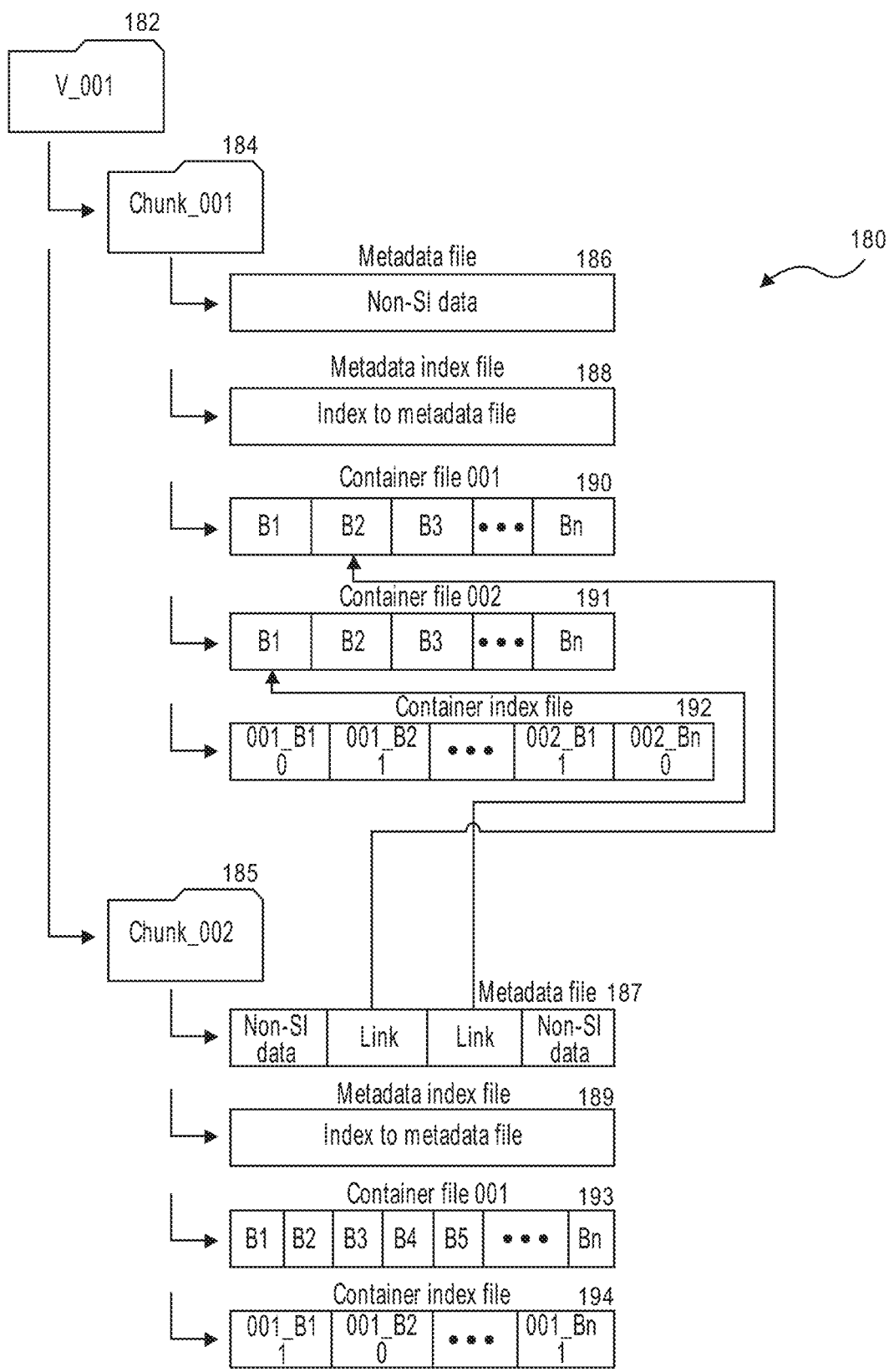

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

The embodiments and components thereof disclosed in FIGS. 1A-1H, may be implemented in any combination and permutation to satisfy data storage management and information management needs at one or more locations and/or data centers.

Live Synchronization and Management of Virtual Machines Across Computing and Virtualization Platforms and Using Live Synchronization to Support Disaster Recovery ("Live Sync")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime. These and other issues can be addressed by using backup or other secondary copy data to synchronize a source subsystem (e.g., a production site) with a destination subsystem (e.g., a failover site). In some illustrated embodiments (see, e.g., FIGS. 2B and 3), source client computing devices include one or more virtual machines (or "VMs") executing on one or more corresponding VM host computers, though the source need not be virtualized. The destination site may be at a location that is remote from the production site, or may be located in the same data center, without limitation. One or more of the production site and destination site may reside at data centers at known geographic locations, or alternatively may operate "in the cloud."

The live synchronization is achieved by generally applying an ongoing stream of incremental backups from the source subsystem to the destination subsystem, according to what is referred to as an "incremental forever" approach. Initially, the source data agent(s) and source media agent(s) work together to write backup or other secondary copies of the primary data generated by the source client computing devices into source secondary storage device(s). Source configuration information is captured and included into at least the initial full backup copy. Next, the backup/secondary copies are retrieved by the source media agent(s) from secondary storage. Next, in systems where the destination subsystem is remote from the source and located across a network, source media agent(s) communicate the backup/secondary copies across a network to destination media agent(s) in destination subsystem.

The data can be copied from source to destination in an incremental fashion, such that only changed blocks are transmitted, and in some cases multiple incremental backups are consolidated at the source so that only the most current changed blocks are transmitted to and applied at the destination. Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations." Next, destination media agent(s) write the received backup/secondary copy data to destination secondary storage device(s). Then, the synchronization is completed when the destination media agent(s) in conjunction with destination data agent(s) restore the backup/secondary copy data to the destination client computing device(s), which were configured based on configuration information obtained from at least the initial full backup copy. Destination client VMs may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site using backup or other secondary copy data, the production environment is not burdened with synchronization operations. Because the destination is maintained in a synchronized "warm" state, the downtime for switching over from the production at the source to the destination is substantially less than with a typical restore from secondary storage. Thus, the production environment or part thereof may fail over with minimal downtime and with relatively up-to-date data to a destination, such as a cloud-based failover site or perhaps a private cloud configuration. The destination site can later be reverse synchronized back to the production environment (failback), such as after repairs have been implemented or after the failure condition at the source has passed. These and more illustrative embodiments are described in further detail below and in the accompanying figures.

In an illustrative embodiment, Live Sync features are implemented as enhancements to data agent functionality both on the source side and the destination side. For example, an enhanced data agent operates at the source, e.g., a Virtual Server Data Agent associated with a VM server, or an application-specific or storage-specific data agent associated with a corresponding application or storage disk in the production environment; correspondingly, an enhanced data agent operates at each destination, e.g., a Virtual Server Data Agent operating at a virtualized backup/disaster recovery site that is different from the source, typically at a distinct geographic location (or cloud) that is suitable for operating as a disaster recovery site. In general, the enhanced data agent at the source tracks data changes and maintains configuration information about the computing platform (e.g., VM or physical platform) in the production environment, and generally ensures that data, metadata, and configuration information (collectively the "collected data") are properly captured into backup copies for replication at the destination. In general, a media agent receives collected data and ensures that secondary copy(ies) are appropriately stored to secondary storage. The enhanced data agent at the source also detects a failure condition in the production environment and notifies an enhanced data agent at the destination to initiate disaster recovery operations.

FIG. 2A is a block diagram of an illustrative data storage management system 200, according to an illustrative embodiment of the present invention, for live synchronization and management of virtual machines across computing and virtualization platforms and for using live synchronization to support disaster recovery to a co-located recovery destination. System 200 illustratively comprises a source (production) subsystem 201 and a destination (failover) subsystem 203 that are co-located in a data center and have in common a storage manager 240 and secondary storage computing device 206 and attached secondary storage device 108 as illustrated. The source subsystem 201 comprises: primary storage device 104-S, which stores primary data; VM host (source) 202-1; and application server (source) 202-2. The destination subsystem 203 comprises: primary storage device 104-D, comprising live-synched primary data; and one or more destination computing devices 202-D (e.g., VM host(s), and/or private cloud computing environment(s)). The components are logically interconnected and in communication with each other via any suitable electronic communications infrastructure, such as described in regard to communication pathways 114.

System 200 is a data storage management system analogous to system 100, and further comprises additional functionality for enabling and performing Live Sync, as described herein. The basic Live Sync configuration duplicates virtual machine data from backups to the destination site on an ongoing basis. Live Sync also replicates virtual machine changes that are captured during backup operations and overlays those changes on destination virtual machines. Live Sync from non-virtualized sources to virtualized ones also is contemplated.

Primary storage device 104-S stores source primary data 112 (not shown here), which is "live" production data that is directly accessed by VMs and/or applications on source client computing devices 202-1 and 202-2. Accordingly, the primary data is read, written, changed, deleted, and/or moved by the particular VM or application that has access to it. Primary storage device 104-D stores data that has been live-synched from the source subsystem and which is accessible to VMs/applications executing on destination computing device(s) 202-D.

Secondary storage computing device 108 was described in more detail above. In the present embodiment, it stores secondary copies (e.g., 216) of data illustratively resulting from full backup and incremental forever backups of primary data as described in more details elsewhere herein.

VM host 202-1 is a client computing device analogous to client computing device 102 (described in further detail above) and illustratively hosts virtual machine(s). VM host 202-2 is a client computing device analogous to client computing device 102 and illustratively hosts one or more applications, which can take the form of a file system manager. More details are given in a subsequent figure. Client computing devices 202 are in communication with primary storage device 104-S, and the VMs/applications executing thereon access primary data on primary storage device 104-S.

Secondary storage computing device 206 is analogous to secondary storage computing device 106 (described in further detail above) and comprises additional components functionality for operating in system 200 and 300. More details are given in a subsequent figure.

Storage manager 240 is analogous to storage manager 140 described in further detail elsewhere herein, and further comprises additional functionality for operating in systems 200 and 300 herein. System 200 comprises a storage manager 240 which is responsible for managing system 200 and storage operations in system 200, for example by communicating with data agent and media agent components to create, move, store, retrieve, and restore secondary copies throughout system 200. For example, storage manager 240 is aware of and able to manage Live Sync components, configurations, and operations. In some embodiments a storage manager 240 at a source location communicates with another storage manager 240 at a destination location. For example, in some embodiments storage manager 240 obtains operational parameters for Live Sync from a user, e.g., identifying clients suitable for Live Sync; communicates Live Sync instructions to data agents 242 and media agents 244; detects or reports on source failures for invoking failover; invokes failback; collects Live Sync statistics on operations and performance, etc. without limitation. More details are given in subsequent figures.

The bold solid unidirectional arrows (1) and (2) collectively represent a logical data flow of an initial full backup and subsequent "incremental forever" backups of data from the source subsystem to secondary storage 108. As described in more detail elsewhere herein, data agents 242 and media agents 244, as directed by storage manager 240, extract suitable data from primary storage, process it, and store it in the form of secondary copies (e.g., 216, not shown here) into secondary storage 108. More details on the logical data flow and the components involved are given in subsequent figures.

The bold dotted unidirectional arrows (3) and (4) collectively represent a logical data flow of the Live Sync operation, which moves secondary copy data from secondary storage 108 to destination primary storage device 104-D according to the illustrative embodiment. Because the source and destination are co-located in the illustrative embodiment depicted here and in FIG. 2B, the same media agent 244 that is involved in creating and storing the secondary copies also is involved in restoring them to the destination to complete the Live Sync operation, although in some alternative embodiments separate source and destination media agents 244 operate side by side in secondary storage computing device 206, or in some other embodiments, in different secondary storage devices 206, respectively.

Figure 2B:
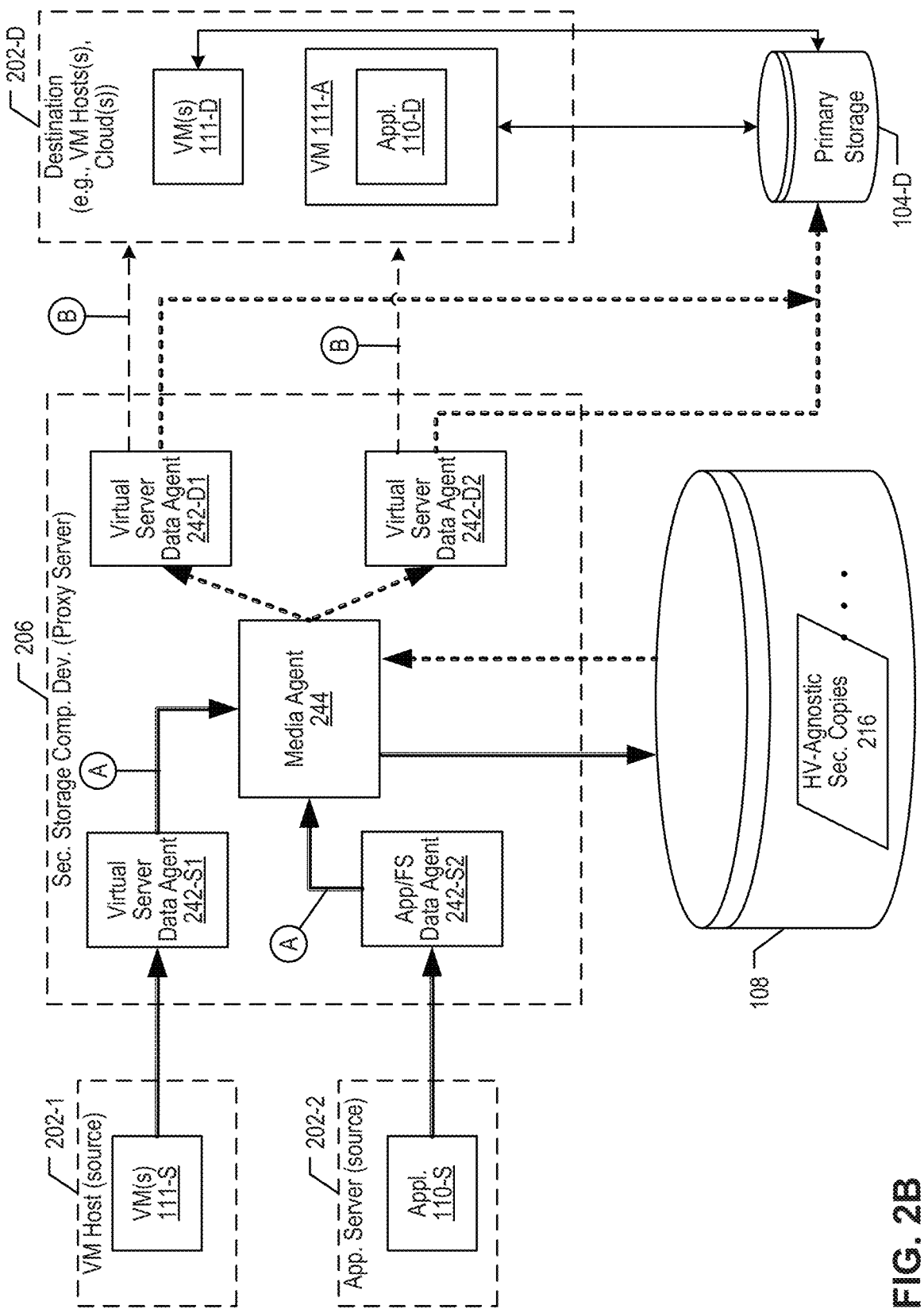
FIG. 2B is a block diagram depicting certain salient details of system 200.

FIG. 2B is a block diagram depicting certain salient details of system 200. VM host 202-1 (source) hosts one or more VMs 111-S. Application server 202-2 (source) hosts an application 110-S, which in some embodiments is a file system (special data agents exist for protecting file system data). Destination client computing device 202-D hosts one or more VMs 111-D, which are configured to correspond in configuration details to respective source VMs 111-S; and also hosts VM 111-A (configured to correspond to source application server 202-2) which in turn hosts application 110-D, which corresponds to source application 110-S. Illustratively, destination client computing device 202-D is a vCenter configuration from VMWARE, Inc., which comprises one or more ESX servers operating therein. Notably, destination VMs 111-D and 111-A can be hosted by more than one destination client computing device 202-D, e.g., a VM host and a private cloud environment. There is no limit on the number of destinations that system 200 can support. Secondary storage computing device 206 illustratively comprises a data agent 242-S1 associated with VM 111-S, another data agent 242-S2 associated with application 110-S, another data agent 242-D1 associated with destination VMs 111-D, and another data agent 242-D2 associated with destination VM 111-A (though in some embodiments data agent 242-D1 can serve VMs 111-D and 111-A), and finally a media agent 244 associated with secondary storage device 108. Storage manager 240 is not shown here. The bold solid unidirectional arrows and the bold dotted unidirectional arrows shown in the present figure correspond to the ones in FIG. 2A and likewise represent logical data flows. Balloons (A) and (B) also are shown.

Secondary copies 216 are similar to secondary copies 116 described in detail elsewhere herein, and further comprise additional information needed for system 200 and 300. A secondary copy 216 of a source VM illustratively is representation of the VM's files (e.g., configuration file(s), VMDK file(s) or equivalent virtual disk file(s), etc.), which store the contents of the VM's hard disk drive and/or other suitable files that make up the VM in its source computing environment. At least the initial full backup copy of every given source client comprises source configuration parameters that the source data agent which created the full backup added into the full backup copy. Subsequent secondary copies after the initial full backup of a given source need not comprise these configuration parameters, because the parameters are used in initially configuring and setting up the destination client. Notably, the secondary copies 216 are hypervisor-agnostic so that they can be later restored to other types of hypervisors.

Data agents 242 (e.g., 242-S1, 242-S2, 242-D1, 242-D2) are analogous to data agents 142 described in more detail elsewhere herein and further comprise additional functionality for operating in systems 200 and 300. Illustratively, data agents 242-S1, 242-D1, and 242-D2 are enhanced virtual server data agents (supplied by Commvault Systems, Inc. of Tinton Falls, N.J., USA), each of which is associated with a single VM or with a VM host computing device (e.g., VMWARE ESX server) or even with a coordinated group of VM host computing devices (e.g., vCenter from VMWARE, Inc.). The virtual server data agent for VMware provides a unified protection and recovery vehicle for all virtual machine data in a VMWARE vCenter, providing complete protection of entire virtual machines. Options such as customized automatic discovery, deduplication, and reporting ensure all virtual machine data is easily traceable and retrievable whenever the need arises.

In regard to the illustrative embodiments, source virtual server data agent 242-S1 (and 242-S in FIG. 3) is enhanced for creating backup copies in a hypervisor-agnostic format (see, e.g., copies 216 in FIG. 2B) that comprise information about the source hypervisor and VM configurations (e.g., VM 111-S) so that the information can be used in configuring a destination using the same or a different hypervisor or version of hypervisor if need be. Accordingly, source virtual server data agent 242-S1 (and 242-S in FIG. 3) comprises functionality for discovering and determining virtualization configuration parameters of the respective source client, e.g., VM 111-S. Example virtualization parameters include the type and "power rating" or "size" of the source client's processor (CPU) and other CPU characteristics, amount of RAM allocated to the VM, size of storage space (e.g., mass storage) and attachment parameters (e.g., how the primary storage is attached to the source production machine, e.g., protocol, slot, etc.). The type and version of source hypervisor also are included in the virtualization parameters as they may be relevant to the destination.

On the destination side, virtual server data agents 242-D1 and 242-D2 (and 242-D in FIG. 3) are enhanced to obtain the source configuration information from the secondary copies (in hypervisor-agnostic format), interpret it, and convert it into suitable configuration parameters for the destination virtualized platform that will host the destination VMs 111-D and/or 111-A. This precedes the restore operation that is part of the Live Sync phase. Illustratively, initial administrative commands that define a destination subsystem include platform information such as Amazon or Azure or vCloud, etc., and based on that information, the destination virtual server data agent performs a suitable conversion (if needed) of source virtualization configuration parameters into destination virtualization configuration parameters.

Source data agents that are not associated with virtualized sources such as application/file system data agent 242-S2 likewise is enhanced to discover and collect configuration parameters from the source computing platform that are captured into the secondary copies and can be used at the destination to convert into virtualization configuration parameters. These parameters are the physical equivalents of virtualization parameters described above, e.g., CPU, RAM, mass storage, connectivity, etc.

The virtualization configuration parameters are illustratively collected by source data agent 242-S (e.g., 242-S1, 242-S2) and applied at the destination client computing device 202-D by destination data agent 242-D (e.g., 242-D1, 242-D2). In system 200 as depicted here, the destination data agent 242-D communicates with the destination client computing device 202-D to instruct that a proper destination client (e.g., VM 111-D, VM 111-A) be installed thereon using the same or suitable configuration parameters as the source. Discovering, collecting, and capturing source configuration parameters (whether virtualized or not) by the source data agent into hypervisor-agnostic secondary copies 216 is illustrated here by balloons (A) at the egress point from virtual server data agent 242-S1, and application/file server data agent 242-S2. Interpreting and converting source configuration parameters into destination-appropriate configuration parameters and causing them to be implemented at the destination computing platform (e.g., 202-D) is illustrated here by the dashed arrows and balloons (B) at the egress from destination data agents 242-D.

Media agent 244 is analogous to media agent 144 described elsewhere herein, and further comprises additional functionality for operating in systems 200 and 300. For example, media agent 244 is responsible, according to system 200 as depicted here, for storing secondary copies into secondary storage 108 and for participating in live-synching those copies to destination primary storage. In some embodiments, media agent 244 also consolidates a number of incremental backup copies into a consolidated copy that comprises only the latest changes to be live-synched to the destination. Media agent 244 also is capable of communicating with other media agents 244, as described in further detail in FIG. 3 and other figures.

Configuration Considerations and Alternative Embodiments

Other embodiments are possible in regard to co-located source and destination subsystems, such as having only VM sources and corresponding VM destinations, having separate source and destination secondary storage computing devices 206 (similar to FIG. 3), having distinct destination client computing devices 202-D for live-synching from different subsets of sources, having multiple alike destination subsystems rather than just one, and/or any combination thereof without limitation. The simplest Live Sync deployment uses streaming backups for critical VMs. Live Sync runs against backups and replicates virtual machines on another server at the same site for quick recovery. For a local recovery site, the source and destination virtual machines (VMs) are hosted illustratively on ESX servers in the same geographic location. The ESX servers can be standalone servers or part of the same VMware vCenter, or the ESX servers at each end can be part of different vCenters. A virtual server data agent 242-S and a media agent 244 are installed on a physical or virtual machine between the source and destination servers (e.g., 206). The Live Sync operation runs against backups to create and update destination VMs. A full or synthetic full backup is used to create the destination VM. Subsequent incremental backups are used to update the destination VMs with changes from the source VMs. This approach is called "incremental forever." The ESX server that hosts the source VMs is touched only once, for the initial backup. Live Sync can also be used in deployments using Commvault Systems' IntelliSnap® backup copies. IntelliSnap leverages hardware snapshots on storage arrays to capture snapshots that are used to create streaming backup copies. Backup copies can be used directly by Live Sync, or they can be used to create auxiliary copies for use with Live Sync. At the source, backup time is reduced by taking a hardware snapshot of the source VMs. The snapshot is then mounted on an ESX server (different from the ESX server that hosts the source VMs). A backup copy operation runs against the snapshot to create a streaming backup copy, and the Live Sync operation runs against the backup copy. The movement of data to the destination is the same as in other scenarios.

Administrative Considerations.

System administration is available from a console (not shown) that accesses one or more storage managers 240. The administration console and connectivity to storage managers for administration purposes is well known in the art. Whether Live Sync operations are to run immediately after backups are completed or on a different asynchronous schedule—these are administrative options that can be chosen and changed by the operator. The actual destination host of the destination VMs also is administrable. Automated destination VM naming conventions, resource pools, network connections, and other options for grouping destination VMs also can be established through administration. Each Live Sync schedule can be customized. For example, whether to validate each Live Sync cycle to verify that the destination VM(s) can be powered up successfully is an administrative option. Storage policy parameters also can be administered in support of Live Sync. For example, auxiliary copies can be set as the source data for Live Sync. For example, selective copies can be established as an option. The administration console also can be used to monitor the status of all VMs in Live Sync schedules; view the progress of Live Sync jobs while they are running or as job history; view configuration, status, and other details of each source and destination VM; and/or in any combination thereof without limitation. A sequence or priority order can be established for booting up the failover VMs in order to minimize the failover delay for certain critical business applications. VM dependencies also can be set, such that if a VM (e.g., VM2) is dependent upon another VM (e.g., VM1), VM2 will not be powered up if the activation of VM1 has failed or VM1 is otherwise inoperative. Similarly, an entire group of destination VMs can be dependent upon one or more other destination VMs. IP masking is another option. Sometimes failover VMs need to have similar IP addresses as the source VMs, but not necessarily an exact match. This can be used to bring up a virtual lab at the destination for verification purposes at the destination subsystem. In this scenario, the source VM system disk is mounted and the registry is updated with user-configured IP settings before replication. The result is that the replicated VMs will have the required IP addresses configured in them.

Figure 3:
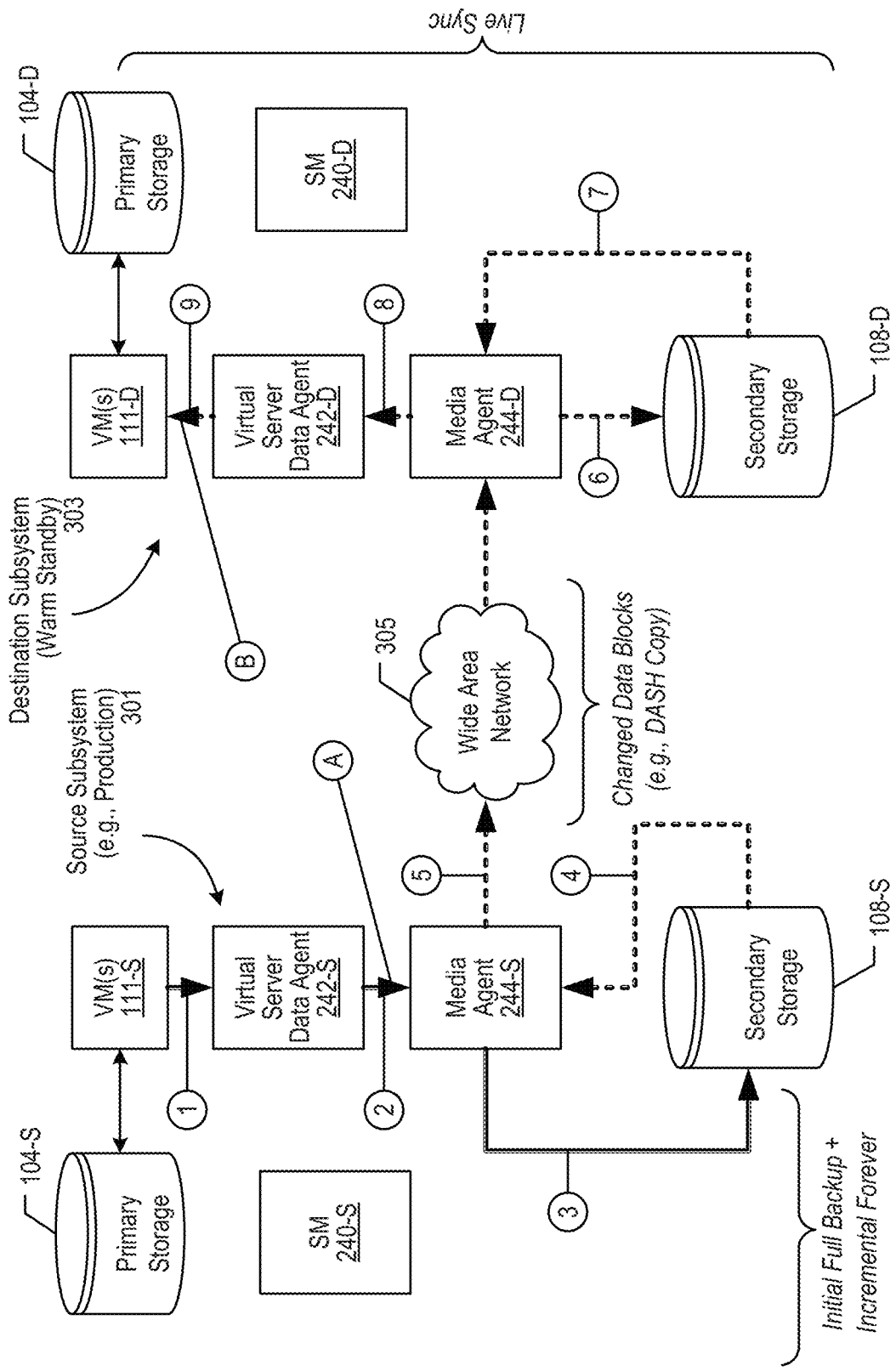
FIG. 3 is a block diagram of an illustrative system 300 live synchronization and management of virtual machines across computing and virtualization platforms and for using live synchronization to support disaster recovery at a geographically separated destination, according to an illustrative embodiment of the present invention.

FIG. 3 is a block diagram of an illustrative data storage management system 300, according to another illustrative embodiment of the present invention, for live synchronization and management of virtual machines across computing and virtualization platforms and for using live synchronization to support disaster recovery at a geographically separated destination(s) apart from the source location. Certain components depicted in earlier figures (e.g., client computing devices 202, secondary storage computing device 206, hypervisor-agnostic secondary copies 216) are understood to be present in system 300, but have been left out of the present figure to simplify the depiction of system 300. For example, source VMs 111-S are hosted by one or more VM hosts 202 at the source, whereas destination VMs 111-D are hosted by one or more destination VM hosts 202 at one or more destinations, which may be local VM host machines or VM host networks (e.g., VMWARE vCenter), private clouds, or public clouds (e.g., AWS, Azure, VMWARE vRealize, etc.); virtual server data agent 242-S and media agent 244-S are hosted by secondary storage computing device 206 operating at the source, whereas virtual server data agent 242-D and media agent 244-D are hosted by another secondary storage computing device 206 operating at the destination; hypervisor-agnostic secondary copies 216 are stored in secondary storage devices 108-S and 108-D. Balloons (A) and (B) also are shown.

System 300 illustratively comprises a source (production) subsystem 301 and a destination (failover) subsystem 303 that are located at separate locations separated by illustrative wide area network 305. The source subsystem 301 comprises: primary storage device 104-S, which stores primary data used by VM(s) 111-S, VM(s) 111-S, virtual server data agent 242-S, media agent 244-S, and secondary storage device 108-S. The destination subsystem 203 comprises: primary storage device 104-D, comprising live-synched primary data to be accessed by VM(s) 111-D, virtual server data agent 242-D, media agent 244-D, and secondary storage device 108-D. The components are logically interconnected and in communication with each other via any suitable electronic communications infrastructure, such as described in regard to communication pathways 114. Network 305 connects the source and destination locations, and is illustratively a wide area network, though in some embodiments it may be a local area network or other local private network infrastructure connecting source and destination subsystems within a building or campus, without limitation. System 300 is a data storage management system analogous to system 100, and further comprises additional functionality for enabling and performing Live Sync across geographically distinct locations as described herein. Like system 200, system 300 also comprises a storage manager 240 (not shown here) which is responsible for managing system 300 and storage operations in system 300, for example by communicating with data agent and media agent components to create, move, store, retrieve, and restore secondary copies throughout system 300. In some alternative embodiments, one storage manager 240 operates at the source location and another storage manager 240 operates at each destination, in order to minimize the risk of a catastrophic failure on either side or in the communication network between them. In a multi-storage manager scenario, each storage manager 240 is aware of and communicates with the other storage manager 240 as needed, e.g., for calling failover or failback.

The bold solid unidirectional arrows (1), (2), and (3) represent a logical data flow of an initial full backup and subsequent "incremental forever" backups of data from the source primary data to secondary storage 108 device 108-S (similar to (1) and (2) in FIG. 2A). As described in more detail elsewhere herein, data agents and media agents, as directed by a storage manager 240, extract suitable data from primary storage, process it, and store it in the form of secondary copies (e.g., 216) into secondary storage device 108-S.

The bold dotted unidirectional arrows (4), (5), (6), (7), (8), and (9) represent a logical data flow of the Live Sync operation, which moves secondary copies from source secondary storage 108-S across network 305 to destination primary storage device 104-D according to the illustrative embodiment. Preferably, data transfer (5) across network 305 is a so-called "DASH copy," provided by Commvault Systems, Inc. of Tinton Falls, N.J., USA. DASH copy is a method for making deduplication-aware secondary copies. DASH technology generates secondary copies of data while maintaining the deduped format. This method eliminates the rehydration process by moving only changed blocks across the network to the destination target. When used with deduplication, ongoing changes for each incremental backup can be transmitted to a secondary copy of backup data at a remote disaster recovery site, with only changed blocks transmitted to the remote site (DASH copy). The DASH copy approach reduces traffic over the wide area network (WAN) and enables faster replication to the destination. In some embodiments, other methods of transferring only changed data blocks from source to destination can be used at step (5) other than DASH copy. In these scenarios, an objective here is to reduce the amount of data and associated bandwidth and processing time required to move secondary copies from source to destination subsystem at step (5) and further at step (6). If wide area network 305 traffic between the primary site and the disaster recovery site is a concern, an auxiliary copy on the disaster recovery site for Live Sync operations is preferred. In some embodiments, SAN and/or HotAdd mode is used to minimize the time for data movement at the remote destination site. For example, in such embodiments, the virtual server data agent 242-D and media agent 244-D at the remote site are both (or only the media agent 244-D is) hosted by a physical machine (SAN mode) or on a virtual machine (HotAdd mode).

Discovering, collecting, and capturing source configuration parameters (whether virtualized or not) by the source data agent 242-S into hypervisor-agnostic secondary copies 216 (see FIG. 2B) is illustrated here by balloon (A) at the egress point from virtual server data agent 242-S. Interpreting and converting source configuration parameters into destination-appropriate configuration parameters and causing them to be implemented at the destination computing platform is illustrated here by balloon (B) at the egress from destination data agent 242-D.

Destination data agent 242-D takes on the task of communicating with the destination client computing device 202-D (not shown here) to instruct that a proper destination client (e.g., VM 111-D) be installed thereon using the same configuration parameters or suitable corresponding parameters as the source. For example, when a source application 110 is to be live-synched to a destination VM, the source configuration parameters must be converted to suitable equivalents supported by the destination hypervisor on the destination VM host. Likewise, when a source VM 111 is to be live-synched to a destination VM on a different virtualization platform having a different hypervisor, the source configuration parameters must be converted to suitable equivalents supported by the destination hypervisor on the destination VM host. The conversion is illustratively performed by the destination data agent 242-D based on conversion logic therein that is designed to interpret source configuration parameters found in the secondary copy 216 being restored to the destination (typically in the initial full backup copy) and determine appropriate destination parameters that can suitably accommodate a live-synched client.

As with system 200, other embodiments are possible in regard to system 300 such as having only virtualized sources and destinations; having multiple distinct destination subsystems 303, each one configured as shown here; having multiple distinct source subsystems 301 using the same destination subsystem 303 or using multiple destination subsystems 303; and/or in any combination without limitation.

Configuration Considerations and Alternative Embodiments

For larger implementations using a remote disaster recovery site, the optimal solution uses auxiliary copies at the remote site, DASH copy transfers of incremental backup data, and deduplication. As with a simple deployment, incremental forever is also used. An auxiliary copy feature duplicates streaming backup data to the remote site. The auxiliary copy operation runs on backup infrastructure without any impact on production systems. Live Sync uses the auxiliary copy at the remote site to create and maintain destination VMs. Deduplication between the local and remote site reduces the amount of network traffic by only transmitting new or changed data blocks to the remote site (DASH copy). The source site can use streaming backups or Commvault Systems' IntelliSnap backup copies. The destination is a remote Disaster Recovery (DR) site. For example, the source site could be New York City and the destination could be Philadelphia. A cloud or wide area network, e.g., 305, is between the source and destination. Backups are performed at the source site. Backup data is transferred to the remote site using an auxiliary copy operation. Data agents 242 and media agents 244 are deployed at both the source site and destination site as depicted in FIG. 3. To reduce traffic over the WAN, deduplication is used to identify changed blocks and only transmit the changed blocks. Compression is used to further reduce the size of data packets that are transmitted between the source and destination sites. This general architecture can be leveraged to maintain multiple destination sites. In this scenario, we have one source site (e.g., New York) and multiple destination sites (e.g., Philadelphia and Los Angeles). Each site (source and destinations) has at least one data agent 242 and media agent 244.

Figure 4:
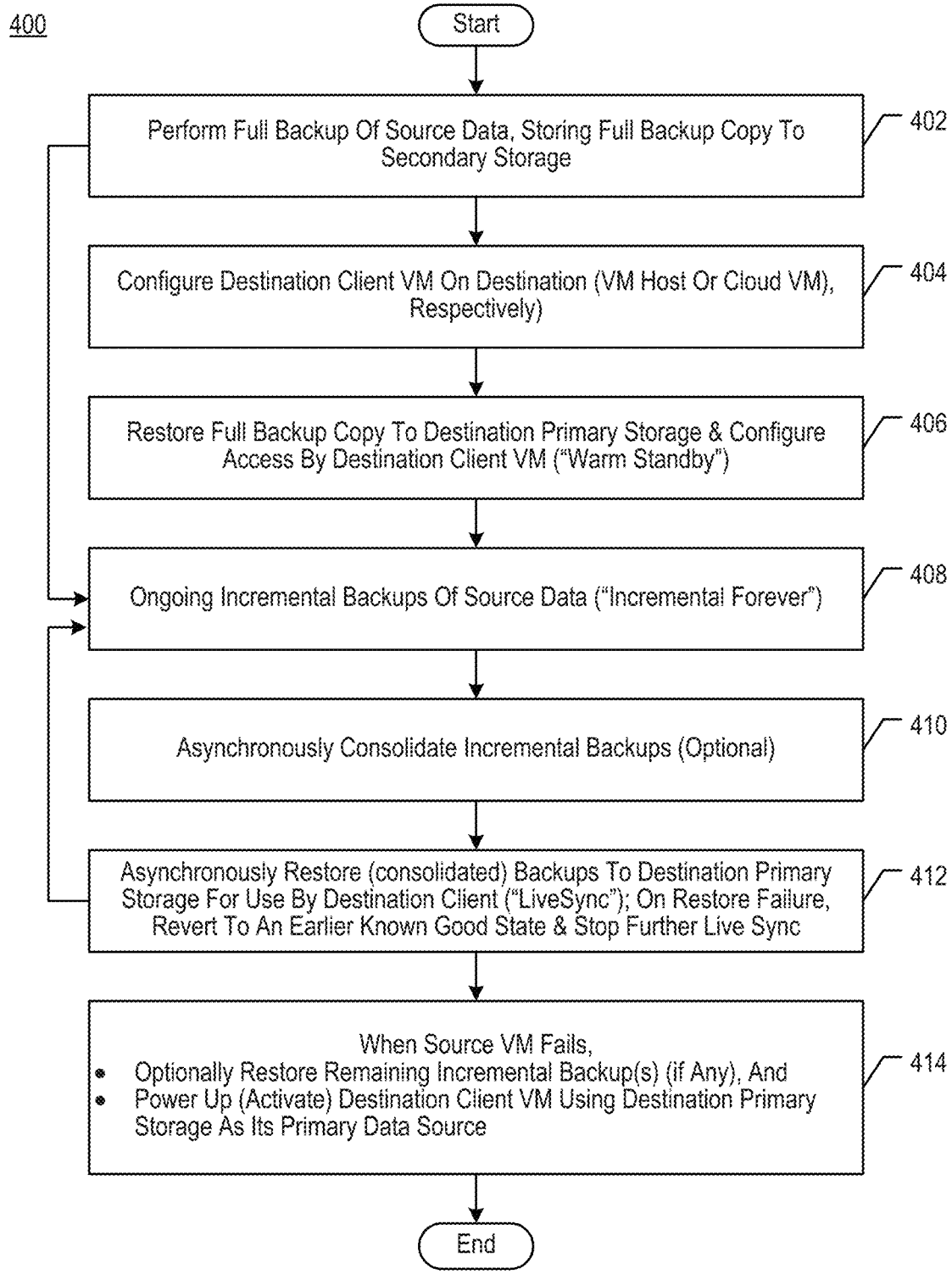
FIG. 4 is a flow chart depicting an illustrative method 400, according to an illustrative embodiment of the present invention.

FIG. 4 is a flow chart depicting an illustrative method 400 according to an illustrative embodiment of the present invention. Illustratively, method 400 is performed in system 200 or a like data storage management system having co-located source and destination subsystems. Other considerations and additional functionality, which is described in more detail in regard to a multi-location system such as system 300 is described in illustrative method 500. Aspects of method 500 can be incorporated into method 400 as appropriate, according to some alternative embodiments.

At block 402, a full backup of source primary data is performed, and the resulting full backup copy 216 is stored into secondary storage 108. Full backups are well known in the art, but as noted above in regard to balloon (A) in FIGS. 2B and 3, the present full backups are enhanced to include source configuration information. Accordingly, source data agents 242-S discover configuration parameters at the source, convert them into hypervisor-agnostic information, and include the information into the full backup copy 216 to be used later at the destination. In the present scenario, the full backup is initiated by storage manager 240 and is performed by a data agent 242-S in conjunction with media agent 244, ultimately resulting in a full backup copy 216 representing the source data from primary storage 104-S. See, e.g., operations (1) and (2) in FIG. 2A. Live Sync uses a full or synthetic full backup to create each destination VM. Live Sync schedules can be configured to create multiple Live Sync jobs for each schedule, with each job using its own stream for a subset of virtual machines; this approach dramatically reduces the amount of time required to replicate large numbers of virtual machines. Control passes to block 404 for configuring the destination client and to block 408 for ongoing incremental backups after the initial full backup. Blocks 404 and 408 are mutually asynchronous and need not occur concurrently.

At block 404, a destination client (e.g., VM 111-D, VM 111-A) on a destination computing device 202-D is initially configured. As noted in regard to balloon (B) in FIGS. 2B and 3, destination data agent 242-D extracts configuration parameters from secondary copy 216 (typically in the initial full backup copy), analyzes them against the destination computing platform, determines whether a conversion is required to accommodate the destination computing platform, performs the conversion if needed, and causes suitable configuration parameters to be implemented on the destination computing platform in order to set up the destination client, e.g., VM 111-D. This includes the destination data agent communicating with the destination computing platform and instructing the set-up of the desired destination client VM having suitable configuration parameters. In addition to information extracted from secondary copy 216, destination data agent 242-D also obtains other information from storage manager 240, such as identifier(s) of the destination computing platform, (e.g., URLs and/or IP addresses), the type of destination, e.g., Amazon AWS, Microsoft Azure, VMWARE vCloud, etc. Source and destination computing platforms may comprises different hypervisors and/or no source hypervisors at all.

At block 406, the full backup copy 216 is restored from secondary storage 108 to destination primary storage 104-D and access to the restored data is configured by the destination client and/or destination host. Preferably, the restore operation occurs immediately after the full backup is completed, in order to maximize readiness at the destination subsystem. Data agent 242-D and media agent 244 are responsible for performing the restore operation based on instructions received from storage manager 240. See, e.g., operations (3) and (4) in FIG. 2A. In alternative embodiments, a destination data agent 242-D executes on the destination client computing device (co-resident with the destination client) and cooperates with media agent 244 to perform the restore operation. At this point, once access to restored data has been established at the completion of block 406, a destination client (e.g., VM 111-D, VM 111-A) has a primary data source to work with by having access to the restored full backup data and is said to be in warm standby, ready to take over from the source client. Examples of VM restoration techniques can be found in U.S. Pat. No. 9,417,968, entitled "Efficiently Restoring Execution of a Backed Up Virtual Machine based on Coordination with Virtual-Machine-File-Relocation Operations" as well as in U.S. Pat. Pub. No. 2016/0085636, entitled "Efficiently Restoring Execution of a Backed up Virtual Machine based on Coordination with Virtual-Machine-File-Relocation Operations."

At block 408, ongoing incremental backups of source primary data occur following the full backup at block 402, and go on indefinitely without limitation ("incremental forever"), e.g., until such time as a failover is called. Each incremental backup operation is performed by the associated source data agent 242-S and media agent 244, typically based on a schedule provided by storage manager 240, e.g., every 15 minutes. Each incremental backup operation results in a secondary copy 216 that represents a point-in-time incremental backup copy of the source data at the time the incremental backup was taken, e.g., changed data blocks since the preceding backup. The incremental backup copy can be, in some embodiments, a changed-block mapping based on successive hardware snapshots of the source storage volume that comprises the source data. In other embodiments changed data blocks are tracked by the source data agent 242-S until the incremental backup copy is created and the changed-block tracking starts afresh. Any incremental backup technique that results in a point-in-time representation of the source primary data can be used here without limitation. Incremental backup techniques and resulting incremental backup copies are well known in the art. Any schedule for the incremental backups can be used here, e.g., every 10 minutes, hourly, semi-daily, daily, etc. The frequency of the incremental backups depends on the implementer's preferences, including how critical the source data is and how often changes should be captured and saved as point-in-time secondary copies. No time limit or end time is set for the "incremental forever" incremental backups. Because Live Sync is based on backups, the acceptable time interval within which virtual machine data must be recoverable, is determined by the frequency of backups. Live Sync can be used to replicate virtual machines from a streaming backup, auxiliary copy, or backup copy.

At block 410, if more than one incremental backup has accumulated in secondary storage 108 before live-synching to the destination, a consolidation of the accumulated incremental backups is performed, illustratively by media agent 244. This operation is optional. Illustratively, a synthetic full backup is run on a periodic basis to consolidate incremental backups into full VM backups without the need to touch production VMs. Synthetic full backups trigger a Live Sync operation but only apply changes from any incremental backups that have not yet been replicated to the destination. Illustratively, media agent 244 identifies the incremental backup copies 216 that have not yet been live-synced to the destination, analyzes the incremental changes therein, and consolidates them into one representation of all the latest changes since the most recent backup copy that was live-synched to the destination. This operation advantageously reduces the amount of data that needs to be sent and applied to the destination. Since block 410 is asynchronous with block 408, it illustratively occurs less frequently than the interval between incremental backups, e.g., daily consolidation instead of hourly incremental backups. Rather than chronologically restoring several incremental backups to the destination by "replaying" each one in turn, it is preferable to consolidate the most recent changes into one consolidated copy and restore only the consolidated copy to the destination. However, in some embodiments each incremental backup is live-synched to the destination after being made, one at a time, and without waiting for further incremental backups; in such an embodiment there would not be anything to consolidate here. In yet other embodiments, this block is skipped and the incremental backups are chronologically restored one at a time to the destination, even when a number of them have accumulated (e.g., nightly).

At block 412, the incremental backups are live-synched to the destination, whether individually or in a consolidated format. Accordingly, media agent 244, in conjunction with the destination data agent 242-D associated with the destination client, restores the incremental copy to destination primary storage 104-D for use by the destination client, e.g., VM 111-D, VM 110-A. In embodiments where the incremental backups are first consolidated at block 410, Live Sync comprises both the consolidation step at block 410 and the present restore operation(s) to bring the destination primary storage 104-D up to date with the incremental backups collected at the source. Restore operations are described in more detail elsewhere herein, but in short, a restore operation causes data to be transformed from secondary copy format (e.g., deduplicated, compressed, encrypted, and/or accompanied by copy metadata, etc.) into primary data format, which is native to the destination client VM and/or application executing thereon and can be directly accessed thereby in this native format. Illustratively, media agent 244 keeps track of the incremental copies, the consolidations (if any), and the restore operations so that chronology can be properly maintained and successive incremental backups are not missed. For example, if a restore operation fails, media agent 244 would track the failure and try again. In some embodiments, this block is executed without further instructions or communications received from storage manager 240, i.e., autonomously and automatically, after initial instructions are given to the data agents 242 and media agent 244 involved in Live Sync operations. Autonomous operations here make sense, because after a Live Sync relationship has been established between a given source and one or more destinations, the incremental backups and subsequent Live Sync operations preferably will continue automatically according to a pre-defined plan, including a schedule for the backups, consolidation, and restore operations. On the other hand, in some alternative embodiments, storage manager 240 manages each and every storage operation described here and sends timely instructions to the appropriate media agent 244 and data agent 242 to execute the backup (402, 408), consolidation (410), transmission, and/or restore (406, 412) according to a plan maintained by storage manager 240. Control may pass back to block 408 for further incremental backup operations.

On restore failure, destination data agent 242-D is configured to try the restore operation again until the restore operation succeeds or a re-try threshold is passed, whichever occurs first. Once the restore re-try threshold is passed, e.g., three retries, the data agent 242-D invokes a reversion to an earlier known good backup copy, i.e., restoring an earlier point-in-time backup copy having a known good state. If this reversion is successful, the destination client VM is available in warm standby mode, but based on the earlier point in time. The data agent 242-D blocks further Live Sync restore operations at this point and issues notice to an administrator or user to require manual intervention. In some alternative embodiments, these actions are managed by storage manager 240 after being notified of failures by destination data agent 242-D and/or media agent 244 (244-D), e.g., keeping count of failed restores, identifying a known good earlier backup copy, blocking further Live Sync operations, notifying administrator/user, etc., and/or in any combination with data agent 242-D and media agent 244-D without limitation.

At block 414, when a source component fails, or a failure is detected or inferred, a failover is invoked to a Live Sync destination client, e.g., VM 111-D, VM 111-A. First, the failure of the source VM may be detected in a number of ways. For example the VM failure may be detected and reported to source data agent 242 by one or more of: the source VM host hypervisor (e.g., ESX server), the source VM host control center (e.g., VMWARE vCenter controller), the associated data agent, e.g., 242-S1, a destination data agent 242-D1 that is in communication with the source data agent, a storage manager 240 that detects a failure in communications with source data agent 242-S (e.g., 242-S1), etc. In some embodiments, the data agent at the destination maintains ongoing communications, e.g., pings, messages, etc., with the corresponding data agent at the source, and therefore is able to detect or infer failure at the source when communications are lost. Other examples of heartbeat monitoring to enable detection of VM failure are given in U.S. Provisional Patent Application No. 62/402, 269, filed on Oct. 17, 2016 and entitled "Heartbeat Monitoring of Virtual Machines for Initiating Failover Operations in a Data Storage Management System," which is hereby incorporated by reference herein. Likewise, in regard to source applications 110, failure can be detected in similar ways, such as by the application's host, its associated source data agent (242-S2), by storage manager 240, by another data network component, etc., without limitation. In some embodiments, once failure of the source has been detected/inferred, pro-active commands and or instructions are directed to the source subsystem to ensure that the source client has been expressly deactivated in order to avoid potential conflicts with the failover system taking over production operations.

Once the failure has been detected, it must be determined whether any incremental backup copies remain in secondary storage 108 which have not as yet been live-synched to the destination. Media agent 244 illustratively makes this determination, based on the tracking it performs, e.g., using media agent index 153. If such incremental backup copies remain and it is still possible to restore them to the destination subsystem, then restore operations for them are invoked immediately (as in block 412), which may be preceded by consolidation (as in block 410). Preferably, this step ensures that the most recent incremental backup captured at the source before the failure is detected is live-synched the destination. In some cases, this will not be possible or desirable. For example, if there is no time to waste in restoring the "left-behind" incremental copies, and it is preferable to immediately invoke failover.

Next, the destination client (e.g., VM 111-D, VM 111-A) will be powered up on the respective destination host in destination subsystem 203. This operation may be performed by media agent 244, by destination data agent 242 associated with the destination client (e.g., 242-D1), by storage manager 240, by the respective host client computing device 202-D, etc., without limitation. In some systems, a hierarchy of preferences is implemented, so that more than one system component can invoke the power-up operation in case other components are out of communication, have failed, and/or are not otherwise unavailable. After the power-up is completed, the destination client (e.g., VM 111-D) will become fully operational using the most recently live-synched data as its primary data source in primary storage device 104-D. If there are machine dependencies or other configuration dependencies at the source, the dependencies are maintained by the destination data agent so that failover VMs can be activated in a proper sequence for a seamless failover.

Other configurations and actors are possible in system 200, such as test scenarios when the source has not failed, dual source and destination media agents 244, destination-side consolidation, and other variations, without limitation. Some of these variations are described in regard to system 300 and method 500 below, but they can be incorporated into system 200 and method 400 as appropriate.

Figure 5:
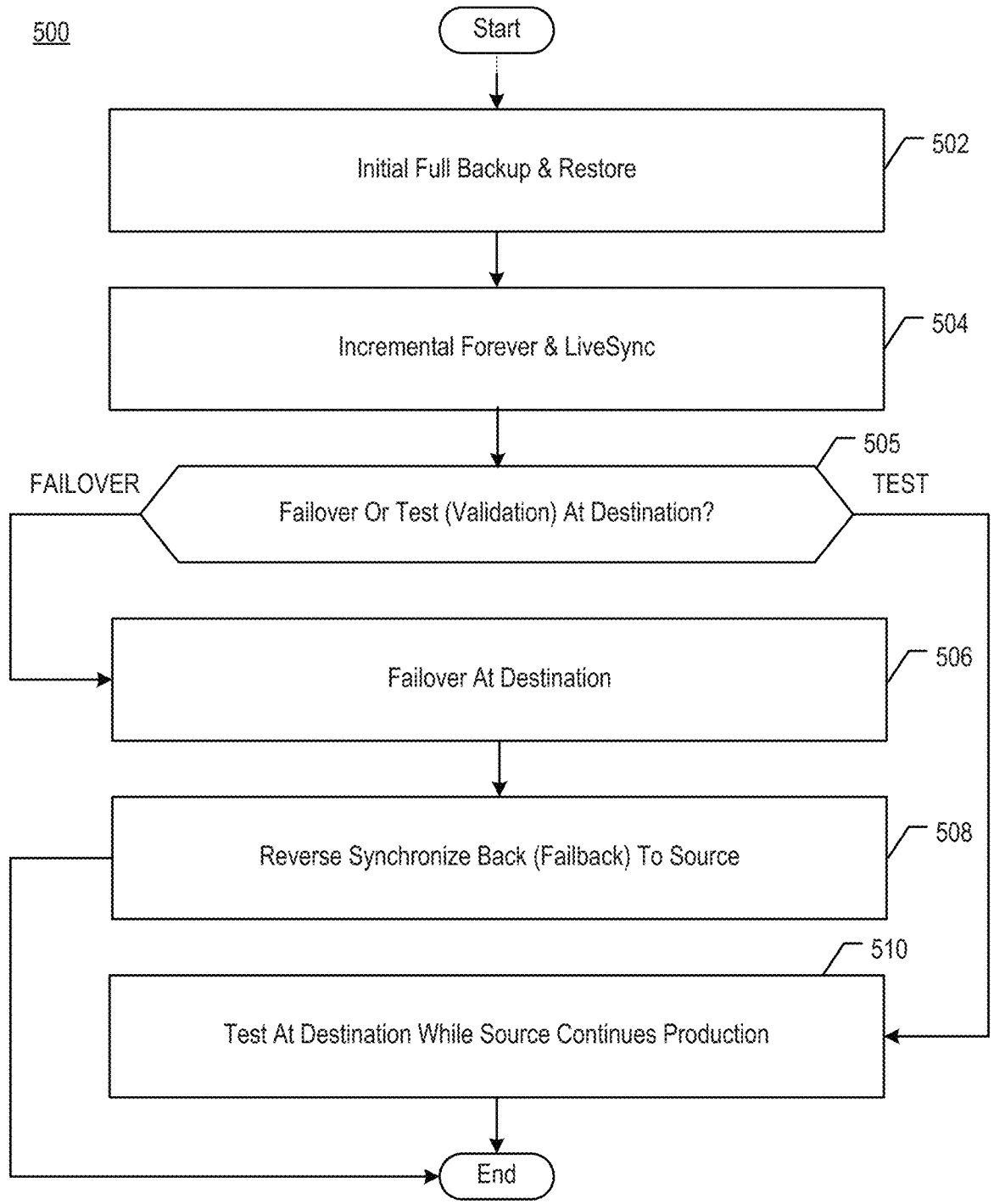
FIG. 5 is a flow chart depicting an illustrative method 500, according to an illustrative embodiment of the present invention.

FIG. 5 is a flow chart depicting a method 500 according to an illustrative embodiment of the present invention. Illustratively, method 500 is performed in system 300 or a like data storage management system having one or more destination subsystems that are remote from the source subsystem. Some of the operations of method 500 make reference to operations in method 400, which should be understood here in the context of the configuration of system 300, rather than system 200.

At block 502, an initial full backup of the source primary data is followed by restoring the full backup copy to the destination, in which at least one destination client becomes operative in warm standby mode. More details are given in a subsequent figure.

At block 504, incremental forever backups are performed and incremental backup copies are live-synched to the destination. More details are given in a subsequent figure.

At block 505, a decision point determines whether a failover should be invoked or a whether a test procedure is desired at the destination subsystem while the source continues to operate in production mode. In case of a failover, control passes to block 506. In case of a test, control passes to block 510.

At block 506, a failover at the destination is invoked, because the source is not operational, whether intentionally (e.g., on demand, planned failover, etc.) or due to a catastrophic failure. More details are given in a subsequent figure.

At block 508, which follows a failover scenario at the destination, it is possible to use Live Sync techniques to reverse synchronize the destination back to the source (failback) after the source subsystem is determined to be repaired/operational again. More details are given in a subsequent figure.

At block 510, a test at the destination subsystem is performed using live-synched data, but no failover is called and the source continues operating in production mode. More details are given in a subsequent figure.

Figure 6:
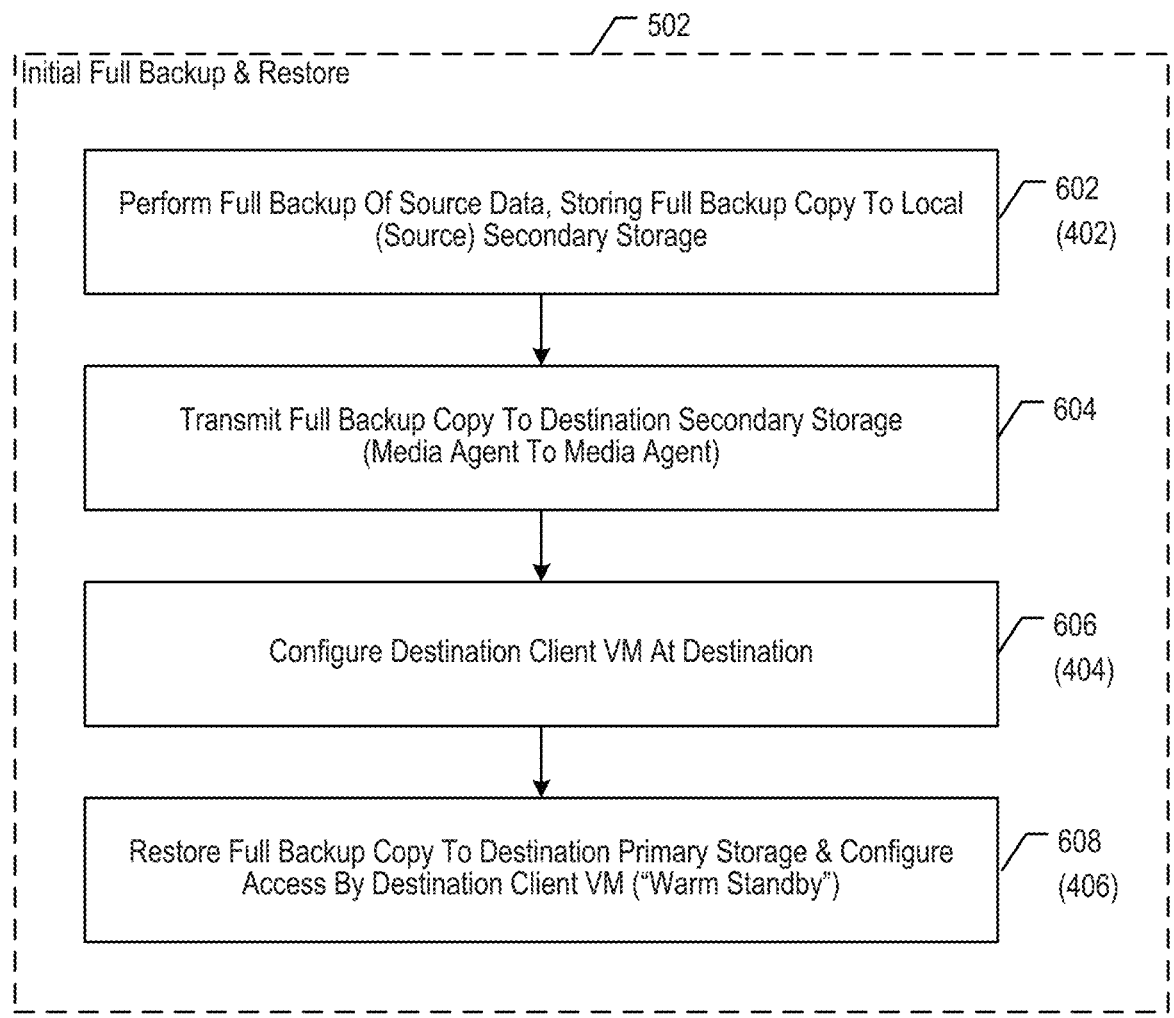
FIG. 6 depicts some salient sub-operations of block 502 in method 500.

FIG. 6 depicts some salient sub-operations of block 502 in method 500. Block 502 is generally directed at performing an initial full backup and restore in system 300. This operation is analogous to blocks 402-406 in method 400, and additional details are provided below.

At block 602, which resembles block 402, a full backup of source primary data is performed, and the resulting full backup copy 216 is stored into secondary storage 108-S in the source subsystem. In the present scenario, the full backup is initiated by a storage manager 240 and is performed by data agent 242-S and media agent 244-S, ultimately resulting in a full backup copy of the source data from primary storage 104-S. The full backup copy 216 comprises source configuration information as explained in regard to balloon (A) in FIGS. 2B and 3. See, e.g., operations (1), (2), and (3) in FIG. 3 and accompanying text.

At block 604, the full backup copy 216 is transmitted from source secondary storage 108-S to destination secondary storage 108-D, by source media agent 244-S to destination media agent 244-D. See, e.g., operations (4), (5), and (6) in FIG. 3 and accompanying text. This transmission preferably occurs immediately after the full backup is completed at the preceding block, in order to maximize readiness at the destination subsystem.

At block 606, which resembles block 404, the destination client VM on destination client computing device 202-D is established, i.e., configured with proper configuration parameters but not powered up (activated) as yet.

At block 608, which resembles block 406, the full backup copy in destination secondary storage 108-D is restored to destination primary storage 104-D in the form of primary data and access to the restored primary data by destination client (e.g., VM 111-D) is established at this point. Preferably, the restore operation occurs immediately after the full backup arrives at destination secondary storage device 108-D and the destination client is set up, in order to maximize readiness at the destination subsystem. Destination data agent 242-D and media agent 244-D are responsible for performing the restore operation based on instructions received from a storage manager 240. See, e.g., operations (7), (8), and (9) in FIG. 3 and accompanying text. At this point, the destination client (e.g., VM 111-D) has a primary data source to work with by having access to the restored data in destination primary storage 104-D and the destination client VM is said to be in a warm standby state, ready to take over from the source client or to conduct a test run.

Figure 7:
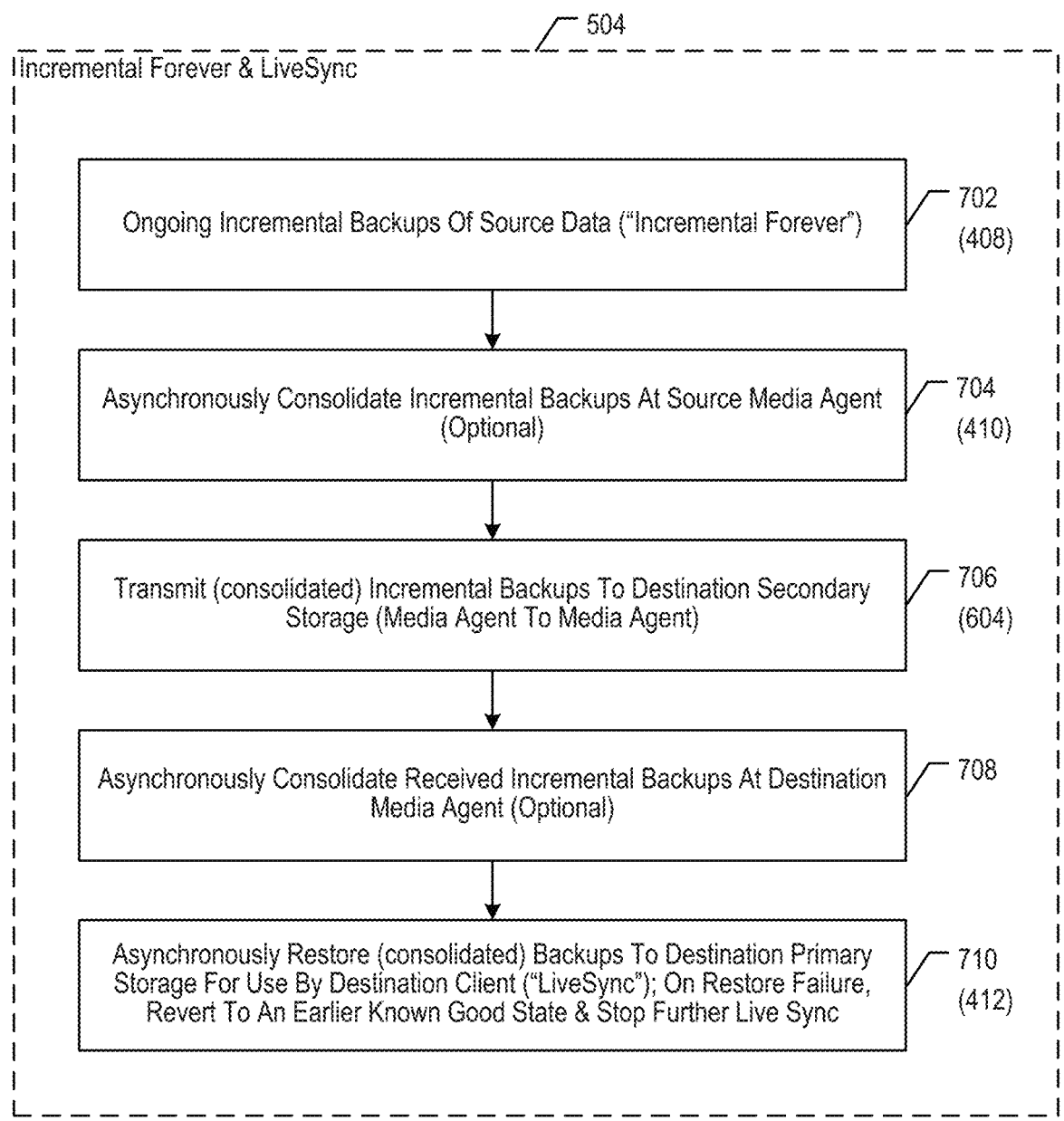
FIG. 7 depicts some salient sub-operations of block 504 in method 500.

FIG. 7 depicts some salient sub-operations of block 504 in method 500. In general, block 504 is directed at performing "incremental forever" incremental backups and live-synching the incremental backups to the destination.

At block 702, which resembles block 408, ongoing incremental backups of source data proceed following the full backup at block 502, and go on indefinitely without limitation ("incremental forever") until such time as a failover is called, for example, or the process is stopped on demand. Each incremental backup operation is performed by the source data agent 242-S associated with the source client (e.g., VM 111-S) in conjunction with source media agent 244-S, typically on a schedule provided by a storage manager 240. In other embodiments, changed data blocks are tracked by the source data agent 242-S until the incremental backup copy is created and the changed-block tracking starts afresh. Any incremental backup technique that results in a point-in-time representation of the source primary data can be used here without limitation. Incremental backup techniques and resulting incremental backup copies are well known in the art. Any schedule for making the incremental backups can be used here, e.g., every 10 minutes, hourly, semi-daily, daily, etc.

At block 704, which resembles block 410, and illustratively occurs asynchronously with the incremental backup operations, incremental backups are optionally consolidated at the source by media agent 244-S. Accordingly, if more than one incremental backup has accumulated in source secondary storage 108-S before live-synching to the destination, a consolidation of the accumulated incremental backups is performed. This operation is optional. Illustratively, media agent 244-S identifies the incremental backup copies that have not yet been live-synched to the destination, analyzes the incremental changes therein, and consolidates them into one representation of all the latest changes since the most recent backup copy that was live-synched to the destination. Because the present block is asynchronous with block 702, it illustratively occurs less frequently than the interval between incremental backups, e.g., daily consolidation instead of hourly incremental backups. Rather than chronologically transmitting several incremental backups to the destination, it is preferable to consolidate changes before transmission. However, in some embodiments, each incremental backup is live-synched to the destination after being made, one at a time, and without waiting for further incremental backups, and therefore in such a scenario there would not be anything to consolidate here. In yet other embodiments, the present block is skipped and the incremental backups are chronologically transmitted one at a time to the destination, even when a number of them have accumulated.

At block 706, which resembles block 604, incremental backup copies (whether individually or in consolidated form) are transmitted by source media agent 244-S to destination media agent 244-D, illustratively via network 305, and are stored by media agent 244-D to destination secondary storage device 108-D. See, e.g., operations (4), (5), and (6) in FIG. 3 and accompanying text. This transmission preferably occurs immediately after the optional consolidation operation is completed in the preceding block. If there is no consolidation step, the incremental backup copies are transmitted chronologically, preferably immediately following the creation of each incremental copy or, in some embodiments, multiple incremental copies are bunched together and transmitted asynchronously, e.g., daily, as a group, or as a batch job, to destination media agent 244-D. However, the present transmission step is asynchronous with the creation of any given incremental copy and/or consolidated copy, and the transmission time can be set independently of those earlier operations.

At block 708, an optional consolidation operation occurs at the destination subsystem and is performed by media agent 244-D. Illustratively, this step is used in embodiments where block 704 is skipped. In this scenario, although incremental backup copies were received individually from the source subsystem, it is advantageous to consolidate them (as in blocks 704, 410) before live-synching the result to destination primary storage 104-D. Restoring a consolidated backup copy will generally take less time than restoring each individual incremental backup copy one at a time.

At block 710, which resembles block 412, the incremental backups in destination secondary storage 108-D are live-synched to the destination, whether individually or in a consolidated format. On failure conditions, remedial actions occur as described at block 412.

In some alternative embodiments, a storage manager 240 in source subsystem 301 manages each storage operation at the source and sends instructions to the appropriate media agent 244-S and data agent 242-S to execute the backup (602, 702), consolidation (704), and transmission (706) according to a schedule maintained by the source storage manager 240. A destination storage manager 240 in destination subsystem 303 manages storage operations at the destination and sends instructions to the appropriate media agent 244-D and data agent 242-D to restore (608), consolidate (708), and/or restore (710). In other illustrative embodiments only one storage manager 240 manages storage operations in both source subsystem 301 and destination subsystem 303, and instructs the appropriate source and destination media agents 244 and data agents 242 to perform the operations described herein.

Figure 8:
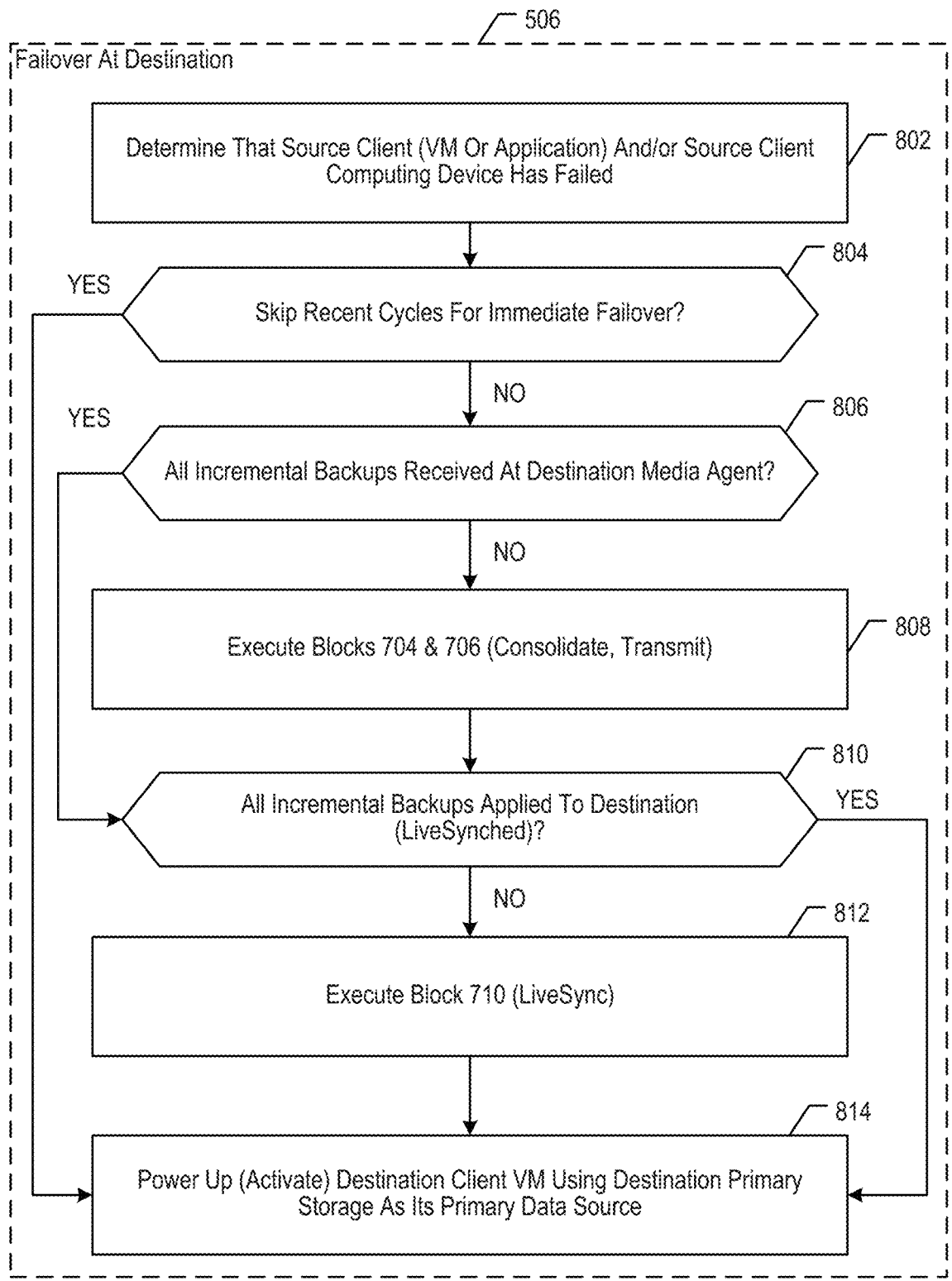
FIG. 8 depicts some salient sub-operations of block 506 in method 500.

FIG. 8 depicts some salient sub-operations of block 506 in method 500. Block 506 generally addresses performing a failover at the destination of system 300. In the event that the source site is unavailable, Live Sync is disabled and destination VMs are powered up at the destination site with appropriate network connections and IP addresses. Planned failovers also are contemplated. A planned failover can be scheduled in order to perform maintenance at the source. This scenario powers off source VMs, performs an incremental backup of source VMs to capture the latest data, and then runs Live Sync to update the VMs in the destination site.

At block 802, which resembles parts of block 414, a determination is made that a failure occurred at the source client (VM or application) and/or source client computing device. The failure of the source VM may be detected or inferred in a number of ways, as described at block 414.

At block 804, a decision point determines whether to skip recent backup cycles in order to invoke immediate failover. Illustratively the decision on skipping is made by storage manager 240. In alternative embodiments, media agent 244-D makes the decision, based on pre-programmed decision factors received at an earlier time from storage manager 240. If the decision is to skip, it means that the data that has been live-synched so far into destination primary storage 104-D is "good enough" and will be used as the primary data source for the failover operation (i.e., the warm standby destination is considered to be ready as is), and control passes to block 814. Otherwise, control passes to block 806.

In some alternative embodiments, "selective copy" is used instead of skipping this step altogether. When setting up a destination, the so-called "selective copy" ensures that only the latest full or synthetic full backup and subsequent incremental backups are copied to the remote site for use with Live Sync. When using selective copy, Live Sync is triggered by the completion of the selective copy operation.

At block 806, which is a decision point, it is determined whether all incremental backup copies taken at the source have been received at the destination by media agent 244-D. Illustratively, the determination is made by storage manager 240, based on storage operation and transmission reports received from media agents 244-S and 244-D. In other embodiments, destination media agent 244-D, which regularly receives reports of newly created incremental backup copies from source media agent 244-S, makes the determination that some of those incremental backup copies have not been received at the destination (whether individually or in consolidated form). If all known incremental backup copies have been received, control passes to block 810, otherwise control passes to block 808.

At block 808, destination media agent 244-D and/or storage manager 240 instructs source media agent 244-S to execute blocks 704 & 706, i.e., consolidate at the source (optional) and transmit to destination.

At block 810, which is a decision point, it is determined whether all known incremental backups have been applied to the destination, i.e., live-synched. The determination is made illustratively by destination media agent 244-D, and in some alternative embodiments by storage manager 240. The determination is based on the tracking information maintained by destination media agent 244-D, e.g., in an index 153. If all incremental backups have been applied, control passes to block 814, otherwise control passes to block 812.

At block 812, block 710 (Live Sync) is executed in order to apply incremental backups to the destination.

At block 814, which resembles parts of block 414, the destination client (e.g., VM 111-D, VM 111-A) will be powered up on the respective destination host (or cloud environment) in destination subsystem 303. This operation is illustratively performed by destination data agent 242-D associated with the respective destination client, e.g., by instructing the destination host 202-D to power up the standby VM; in alternative embodiments the operation is performed by a storage manager 240 operating in the destination subsystem, and/or in combination without limitation. After the power-up is completed, the destination client (e.g., VM 111-D, VM 111-A) becomes fully operational using the most recently live-synched data as its primary data source accessible in primary storage device 104-D. Application 110-D is also activated to execute on (be hosted by) VM 111-A.

Figure 9:
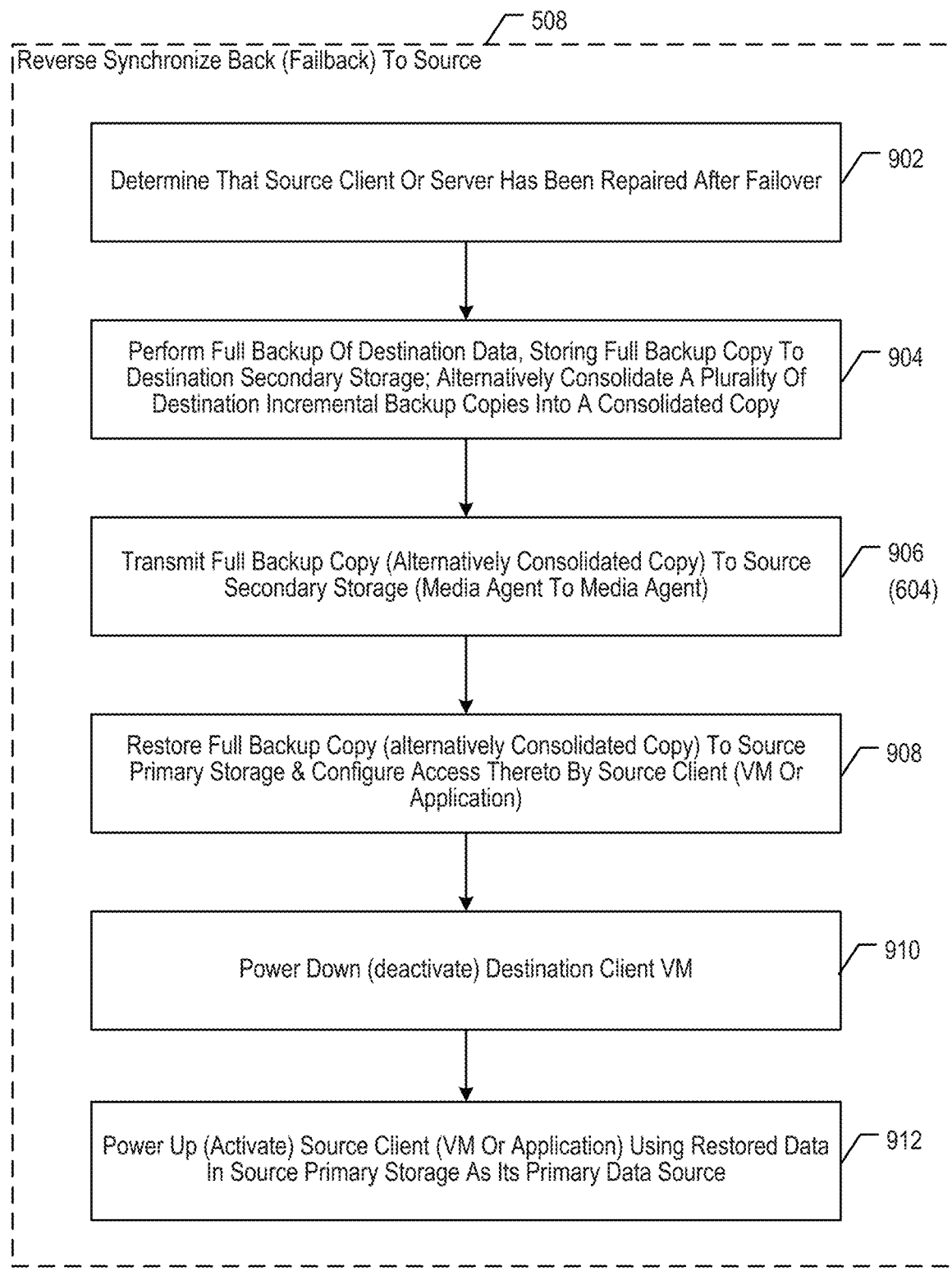
FIG. 9 depicts some salient sub-operations of block 508 in method 500.

FIG. 9 depicts some salient sub-operations of block 508 in method 500. Block 508 is generally concerned with performing a reverse synchronization in system 300 from destination subsystem back to source subsystem (failback), in other words, to restore the status quo before the failover—preferably using the latest primary data that was generated during the failover period at the destination subsystem.

At block 902, a determination is made that the source client or server has been repaired after failover and or/can be activated again. For example, the working source VM may be detected and reported to source data agent 242-S by one or more of: the source VM host or its hypervisor (e.g., ESX server), the source VM host control center (e.g., VMWARE vCenter controller), the associated source data agent, e.g., 242-S, etc. The working status of the source client is illustratively reported to destination data agent 242-D, and in some embodiments to destination storage manager 240. In some embodiments, the determination is made by a system administrator and a command for failback is initiated from a storage manager 240.

At block 904, a full backup of destination primary data is performed, storing the resultant full backup copy to destination secondary storage 108-D. Illustratively, the full backup is performed by data agent 242-D and media agent 244-D under the direction of storage manager 240. This operation resembles operations 402 and 602, but is performed at the destination subsystem rather than at the source. The index information in media agent 244-D is updated to appear as though the destination is a source, so that the remaining failback operations can proceed. In some embodiments, destination data agent 242-D tracks incremental changes occurring at the destination client while it is operational, so that the present operation need not be a full backup and instead the present operation is satisfied by an incremental backup (or preferably a consolidation of multiple incremental backups) that can be applied back to the source. A synthetic full is used in some embodiments.

At block 906, which resembles block 904 in reverse, the full backup copy (or alternatively consolidated incremental copy) is transmitted by media agent 244-D to media agent 244-S, which stores it to source secondary storage device 108-S.

At block 908, which resembles block 608 in reverse, the full backup copy (or alternatively consolidated incremental copy) is restored to source primary storage 104-S and access thereto by the source client is established. At this point, source primary data is caught up with the destination data.

At block 910, destination client, e.g., VM 111-D, is deactivated (powered down). Illustratively the deactivation is performed by the destination VM host as instructed by destination data agent 242-D.

At block 912, the source client (VM or application) using restored data in source primary storage 104-S as its data source is re-activated (powered up). Illustratively the re-activation is performed by the VM host as instructed by source virtual server data agent 242-S and/or by the application server as instructed by its respective associated data agent 242-S. At the completion of this block, the source subsystem 301 is once again operating as the production environment and the destination subsystem 303 is once again the failover system and method 500 may end here or start anew (see, e.g., FIG. 5).

Figure 10:
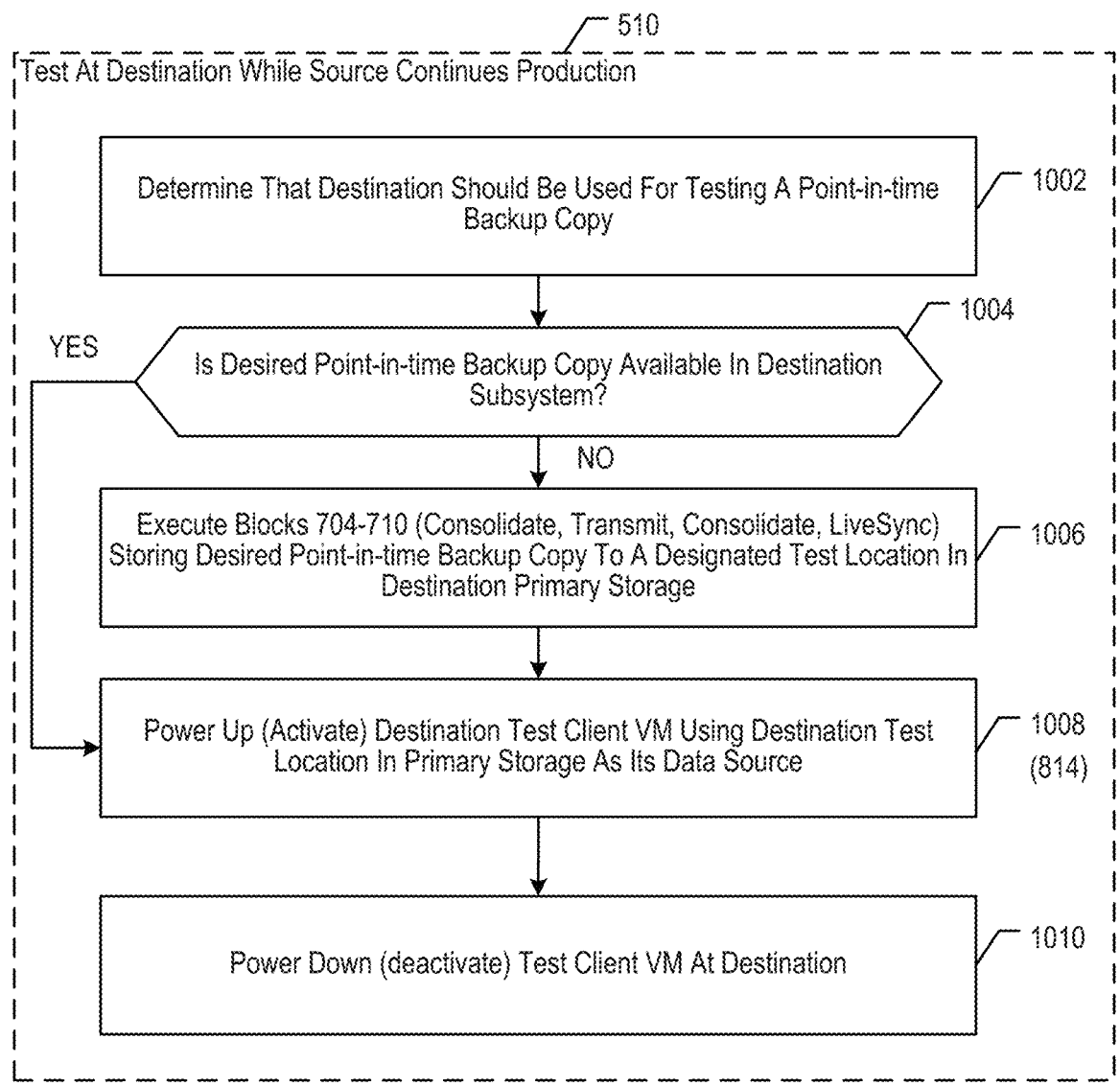
FIG. 10 depicts some salient sub-operations of block 510 in method 500.

FIG. 10 depicts some salient sub-operations of block 510 in method 500. Block 510 is generally concerned with testing (validating) a destination client at the destination subsystem in system 300 while the source client continues operating in production mode. Operators can choose to automatically validate destination VMs after each Live Sync operation by automatically powering the destination VMs on and off to ensure that they are bootable and ready for use. Changes resulting from the power on are not preserved. Any VMs that cannot be validated are queued for resync during the next cycle. To avoid conflicts with the source VM and ensure that the virtual machine is not modified by the test boot, a snapshot of the destination virtual machine is taken before the test boot, each destination VM is booted with network connections disabled, and reverts to the snapshot afterwards. If validation fails, the destination VM reverts to its last valid (bootable) state.

At block 1002, a determination is made, e.g., by a storage manager 240, that the destination subsystem 303 should and can be used for testing a point-in-time backup copy.

At block 1004, which is a decision point, a determination is made whether the desired point-in-time backup copy is currently available in destination subsystem 303. This determination is illustratively made by destination media agent 244-D (e.g., consulting a local index of backup copies received from source media agent 244-S), and in some alternative embodiments a storage manager 240 makes the determination. If the desired point-in-time backup copy is determined to be available in the destination subsystem 303 (e.g., in destination secondary storage 108-D), control passes to block 1008, otherwise control passes to block 1006.

At block 1006, blocks 704-710 (consolidate, transmit, consolidate, Live Sync) are executed to retrieve the desired backup copy from source subsystem 301 and bring it over to be restored to destination subsystem 303.

At block 1008, which resembles parts of block 814, the destination test client, e.g., VM 111-D, is activated (powered up) to a test location in destination primary storage 104-D as its primary data source. In the event of corrupted data in source VMs, another stable recovery point (point in time backup copy) that is available in backup history can be used instead and live-synched to the destination. More details are given in block 814. Test scripts and other test operations are executed now using test client and source data in destination subsystem 303—all the while without involving or affecting the production environment in source subsystem 301. The tests may be automated or manually executed by a user, and/or in combination, without limitation. The test operation is advantageous for verifying the integrity of a secondary copy before it becomes necessary to use it as a failover data source. Likewise, the test operation is advantageous for testing the integrity of the entire destination subsystem, e.g., verifying the compatibility of the source data with the destination hypervisor, VM configuration, software versions, cloud configurations, etc. For example, if the source client was an application 110, it is useful to determine whether it can operate properly in the virtualized environment set up at the destination. Likewise, if the source client was a VM 111, it is useful to determine whether a different hypervisor or a different version of a hypervisor or a cloud computing environment can properly support the VM at the destination. In some embodiments, a test operation according to block 510 is executed after a Live Sync to the destination is completed at block 504, in order to ensure the suitability and fitness for use of the destination subsystem 303 on an ongoing basis. An example of readily accessing backed up VM data is given in U.S. Pat. No. 9,436,555 entitled "Efficient Live-Mount of a Backed up Virtual Machine in a Storage Management System."

At block 1010, the test client at destination subsystem 303 is deactivated (powered down) in a manner similar to block 910. Again, the deactivation operation neither involves nor affects the production environment at source subsystem 301.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, a source storage manager 240 and a destination storage manager 240 may interoperate to manage operations at the source and destination subsystems, respectively. In other embodiments, a storage manager 240 operates in only one of the source and destination subsystems or at another site and manages storage operations and communications from there. In other embodiments, a standby storage manager 240 is configured at the destination and only takes over in a failover situation, but is otherwise passive.

Example Embodiments

Some example enumerated embodiments of the present invention are recited in this section in the form of methods, systems, and/or non-transitory computer-readable media, without limitation.

According to an illustrative embodiment, a method comprises: backing up a first virtual machine into a first full backup copy of the virtual machine stored to a first secondary storage device, wherein the first virtual machine executes over a first hypervisor operating on a first virtual machine server, wherein the first virtual machine accesses data that is stored in a primary storage device that is communicatively coupled with the first virtual machine server, and wherein the first full backup copy comprises, in a hypervisor-independent format, one or more configuration parameters of the first virtual machine. The above-recited method further comprises: transmitting the first full backup copy to a secondary storage computing device, which stores the first full backup copy to a second secondary storage device. The above-recited method further comprises: configuring a second virtual machine, based on the one or more configuration parameters obtained from the first full backup copy. The above-recited method wherein the second virtual machine is configured over a second hypervisor operating on a second virtual machine server which is distinct from the first virtual machine server. The above-recited method further comprises: restoring the first full backup copy to the second virtual machine, which is in communication with a primary storage device storing restored data in native format accessible to the second virtual machine. The above-recited method further comprises: synchronizing the second virtual machine to the first virtual machine. The above-recited method wherein the synchronizing comprises: periodically backing up the first virtual machine to successive incremental backup copies comprising changes relative to a preceding backup copy of the first virtual machine. The above-recited method wherein the synchronizing comprises: transmitting each successive incremental backup copy to the secondary storage computing device, which stores the respective incremental backup copy to the second secondary storage device. The above-recited method wherein the synchronizing comprises: consolidating one or more of the successive incremental backup copies into a consolidated copy before transmitting the consolidated copy to the secondary storage computing device. The above-recited method wherein the synchronizing comprises: restoring each successive incremental backup copy to the second virtual machine, thereby making the second virtual machine ready to operate instead of the first virtual machine, based on the most recent incremental backup copy of the first virtual machine restored to the second virtual machine. The above-recited method wherein the synchronizing comprises: consolidating one or more of the successive incremental backup copies into a consolidated copy before restoring to the second virtual machine.

The above-recited method wherein the first hypervisor is of a first type and the second hypervisor is of a different type; and a data agent associated with the second virtual machine server converts the one or more configuration parameters from the hypervisor-independent format obtained from the first full backup copy into a format suitable for the second hypervisor, thereby enabling the synchronizing to work across different types of hypervisors. The above-recited method further comprising: in response to detecting that the first virtual machine has failed, activating the second virtual machine by the second data agent; and taking over by the second virtual machine instead of the first virtual machine, based on the most recent incremental backup copy of the first virtual machine restored to the second virtual machine. The above-recited method wherein the backing up operations are performed at least in part by a first data agent that is associated with the first virtual machine server. The above-recited method wherein the restoring operations are performed at least in part by a second data agent that is associated with the second virtual machine server, and wherein the second data agent obtains the one or more configuration parameters from the first full backup copy of the first virtual machine. The above-recited method wherein the backing up operations are performed at least in part by a first data agent that is associated with the first virtual machine server. The above-recited method wherein a second data agent that is associated with the second virtual machine server obtains the one or more configuration parameters from the first full backup copy of the first virtual machine and performs one or more of: (a) determines whether the first hypervisor is of the same type as the second hypervisor, (b) converts the one or more configuration parameters from the hypervisor-independent format into a format suitable for the second hypervisor, and (c) instructs the second virtual machine server to configure the second virtual machine according to the converted one or more configuration parameters. The above-recited method wherein the backing up operations are performed by a first data agent that is associated with the first virtual machine server and a first media agent associated with the first secondary storage device. The above-recited method wherein the restoring operations are performed by a second data agent that is associated with the second virtual machine server and a second media agent associated with the second secondary storage device. The above-recited method wherein the second data agent obtains the one or more configuration parameters from the first full backup copy of the first virtual machine and performs one or more of: (a) determines whether the first hypervisor is of the same type as the second hypervisor, (b) converts the one or more configuration parameters from the hypervisor-independent format into a format suitable for the second hypervisor, and (c) instructs the second virtual machine server to configure the second virtual machine according to the converted one or more configuration parameters.

The above-recited method wherein the backing up operations are performed by a first data agent that is associated with the first virtual machine server and a first media agent associated with the first secondary storage device. The above-recited method wherein the restoring operations are performed by a second data agent that is associated with the second virtual machine server and a second media agent associated with the second secondary storage device. The above-recited method further comprising: when the second media agent detects that restoring a first incremental backup copy has failed more than a threshold number of times, the second media agent, in conjunction with the second data agent, (a) restores a second incremental backup copy, which is older than the first incremental backup copy, to the second virtual machine, and (b) blocks any further restore operations to the second virtual machine. The above-recited method wherein the backing up operations are performed at least in part by a first data agent that is associated with the first virtual machine server. The above-recited method further comprising: detecting, by a second data agent that is associated with the second virtual machine server, that a failure has occurred at the first virtual machine server; and in response to the detecting, causing, by the second data agent, the second virtual machine to be activated and to take over instead of the first virtual machine, based on the most recent incremental backup copy of the first virtual machine restored to the second virtual machine. The above-recited method further comprising: reverse synchronizing a backup copy of the second virtual machine to the first virtual machine, wherein the backup of the second virtual machine comprises changes generated by executing of the second virtual machine when operating instead of the first virtual machine. The above-recited method further comprising: after the reverse synchronizing, taking over by the first virtual machine instead of the second virtual machine, based on the backup copy of the second virtual machine restored to the first virtual machine.

The above-recited method wherein the first virtual machine server is geographically remote from the second virtual machine server. The above-recited method wherein the second virtual machine server provides a cloud-based computing platform for the second virtual machine. The above-recited method wherein the second virtual machine is administered as a failover destination for the first virtual machine.

According to another illustrative embodiment, a method comprising: backing up a first virtual machine into a first full backup copy of the virtual machine stored to a first secondary storage device, wherein the first virtual machine executes over a first hypervisor operating on a first virtual machine server, and wherein the first full backup copy comprises, in a hypervisor-independent format, one or more configuration parameters of the first virtual machine. The above-recited method further comprising: transmitting the first full backup copy to a secondary storage computing device, which stores the first full backup copy to a second secondary storage device. The above-recited method further comprising: configuring a second virtual machine, based on the one or more configuration parameters obtained from the first full backup copy, wherein the second virtual machine is configured over a second hypervisor operating on a second virtual machine server which is distinct from the first virtual machine server. The above-recited method further comprising: restoring the first full backup copy to the second virtual machine, which is in communication with a primary storage device storing restored data in native format accessible to the second virtual machine. The above-recited method further comprising: synchronizing the second virtual machine to the first virtual machine. The above-recited method wherein the synchronizing further comprises: backing up the first virtual machine into successive incremental backup copies comprising changes relative to a preceding backup copy of the first virtual machine. The above-recited method wherein the synchronizing further comprises: consolidating one or more of the successive incremental backup copies into a consolidated copy. The above-recited method wherein the synchronizing further comprises: restoring the consolidated copy to the second virtual machine, thereby making the second virtual machine ready to operate instead of the first virtual machine, based on the most recent incremental backup copy of the first virtual machine consolidated into the consolidated copy and restored to the second virtual machine.

Another illustrative embodiment comprises a system for generating virtual machines from backups of source computing platforms, including physical computing devices and/or virtual machines, and maintaining the generated virtual machines synchronized with respective source computing platforms and ongoing backups thereof in preparation for failover from the source computing platforms. The above-recited system comprising: a source computing platform executing a first set of applications and comprising a first data agent; a primary storage device; a secondary storage device for storing backup copies; a destination computing platform (a) hosting a virtual machine and (b) comprising a second data agent. The above-recited system wherein the first data agent is configured to: back up the source computing platform, including the data that is accessed by the first set of applications, to the secondary storage device, wherein an initial full backup is followed by subsequent incremental backups that comprise only changed data relative to an immediately preceding backup, and wherein the initial full backup generates a first full backup copy that comprises, in a hypervisor-independent format, one or more configuration parameters of the source computing platform obtained by the first data agent and converted by the first data agent into the hypervisor-independent format. The above-recited system wherein the second data agent is configured to: convert the one or more configuration parameters from the hypervisor-independent format obtained from the first full backup copy into a format suitable for a hypervisor executing on the destination computing platform. The above-recited system wherein the second data agent is configured to: generate the virtual machine from the initial full backup copy based on the converted one or more configuration parameters. The above-recited system wherein the second data agent is configured to: keep the virtual machine synchronized to the source computing platform by restoring the first full backup copy and the respective subsequent incremental backup copies to the virtual machine. The above-recited system wherein the second data agent is configured to: when detecting that the first computing platform has failed, activate the virtual machine to begin executing instead of the first computing platform, wherein a second set of applications corresponding to the first set of applications execute on the activated virtual machine.

The above-recited system wherein the first data agent is configured to perform the backup operations in conjunction with a media agent associated with the secondary storage device. The above-recited system wherein the second data agent is configured to perform the restore operations in conjunction with a media agent associated with the secondary storage device. The above-recited system wherein the first data agent is configured to perform the backup operations in conjunction with a first media agent associated with the secondary storage device. The above-recited system wherein the second data agent is configured to perform the backup operations in conjunction with a second media agent that receives the first full backup copy and the subsequent incremental backup copies from the first media agent. The above-recited system wherein the first data agent is configured to perform the backup operations in conjunction with a first media agent associated with the secondary storage device. The above-recited system wherein the second data agent is configured to perform the restore operations in conjunction with a second media agent. The above-recited system wherein the first media agent is further configured to periodically consolidate a plurality of the incremental backup copies into a consolidated copy that is transmitted to the second media agent. The above-recited system wherein the respective subsequent incremental backup copies are restored to the virtual machine from the consolidated copy. The above-recited system wherein the first computing platform is a second virtual machine hosted by a second hypervisor and the one or more configuration parameters are formatted independently of the second hypervisor. The above-recited system wherein the second virtual machine executes over and is managed by a first type of hypervisor and the virtual machine at the destination computing platform executes over and is managed by a second type of hypervisor that is different from the first type of hypervisor, thereby enabling synchronization between the source computing platform and the first virtual machine across virtualization platforms. The above-recited system wherein the destination computing platform is implemented as a cloud resource.

Another illustrative method comprises: backing up a first virtual machine that hosts a first application to a first full backup copy of the virtual machine stored to a first secondary storage device, wherein the first virtual machine executes over a first hypervisor operating on a first virtual machine server, wherein the first virtual machine accesses data that is stored in a primary storage device that is communicatively coupled with the first virtual machine server, and wherein the first full backup copy comprises, in a hypervisor-independent format, one or more configuration parameters of the first virtual machine. The above-recited method further comprises: transmitting the first full backup copy to a second secondary storage device, which stores the first full backup copy to a second storage device. The above-recited method further comprises: configuring a second virtual machine, based on the one or more configuration parameters obtained from the first full backup copy, wherein the second virtual machine is configured over a second hypervisor operating on a second virtual machine server which is distinct from the first virtual machine server; restoring the first full backup copy to the second virtual machine, which is in communication with a primary storage device storing restored data in native format accessible to the second virtual machine. The above-recited method further comprises: synchronizing the second virtual machine to the first virtual machine, comprising: periodically backing up the first virtual machine to successive incremental backup copies comprising data blocks that changed relative to a preceding backup copy of the first virtual machine, transmitting each successive incremental backup copy to the second secondary storage device, which stores the respective incremental backup copy to the second storage device, restoring each successive incremental backup copy to the second virtual machine, thereby making the second virtual machine ready to host a copy of the first application, in place of the first application hosted by the first virtual machine, based on the most recent incremental backup copy of the first virtual machine restored to the second virtual machine.

The above-recited method wherein the first hypervisor is of a first type and the second hypervisor is of a different type. The above-recited method wherein a data agent associated with the second virtual machine server converts the one or more configuration parameters from the hypervisor-independent format obtained from the first full backup copy into a format suitable for the second hypervisor, thereby enabling the synchronizing to work across different types of hypervisors. The above-recited method further comprises: in response to detecting that the first virtual machine has failed, activating the second virtual machine by the second data agent; and taking over, by the second virtual machine, the hosting of the copy of the first application in place of the first application hosted by the first virtual machine, based on the most recent incremental backup copy of the first virtual machine restored to the second virtual machine. The above-recited method wherein the backing up is performed at least in part by a first data agent that is associated with the first virtual machine server; and wherein the restoring is performed at least in part by a second data agent that is associated with the second virtual machine server, and wherein the second data agent obtains the one or more configuration parameters from the first full backup copy of the first virtual machine. The above-recited method wherein the backing up is performed at least in part by a first data agent that is associated with the first virtual machine server; and wherein a second data agent that is associated with the second virtual machine server obtains the one or more configuration parameters from the first full backup copy of the first virtual machine and: (a) determines whether the first hypervisor is of the same type as the second hypervisor, (b) converts the one or more configuration parameters from the hypervisor-independent format into a format suitable for the second hypervisor, and (c) instructs the second virtual machine server to configure the second virtual machine according to the converted one or more configuration parameters.

The above-recited method wherein the backing up is performed by a first data agent that is associated with the first virtual machine server and a first media agent associated with the first secondary storage device; wherein the restoring is performed by a second data agent that is associated with the second virtual machine server and a second media agent associated with the second secondary storage device; and wherein the second data agent obtains the one or more configuration parameters from the first full backup copy of the first virtual machine and: (a) determines whether the first hypervisor is of the same type as the second hypervisor, (b) converts the one or more configuration parameters from the hypervisor-independent format into a format suitable for the second hypervisor, and (c) instructs the second virtual machine server to configure the second virtual machine according to the converted one or more configuration parameters. The above-recited method wherein the backing up is performed by a first data agent that is associated with the first virtual machine server and a first media agent associated with the first secondary storage device; wherein the restoring is performed by a second data agent that is associated with the second virtual machine server and a second media agent associated with the second secondary storage device; and when the second media agent detects that restoring a first incremental backup copy has failed more than a threshold number of times, the second media agent, in conjunction with the second data agent, (a) restores an older second incremental backup copy to the second virtual machine, and (b) blocks any further restore operations to the second virtual machine.

The above-recited method wherein the backing up is performed at least in part by a first data agent that is associated with the first virtual machine server; and further comprising: detecting, by a second data agent that is associated with the second virtual machine server, that a failure has occurred at the first virtual machine server; and in response to the detecting, causing, by the second data agent, the second virtual machine to be activated and to take over executing the first application from the first virtual machine. The above-recited method further comprises: reverse synchronizing a backup copy of the second virtual machine to the first virtual machine, wherein the backup of the second virtual machine comprises data changes generated by the executing of the copy of the first application by the second virtual machine; and resuming, by the first virtual machine, executing the first application after the reverse synchronizing. The above-recited method wherein the first virtual machine server is geographically remote from the second virtual machine server. The above-recited method wherein the second virtual machine server provides a cloud-based computing platform. The above-recited method wherein the second virtual machine operates as a failover destination for the first virtual machine.

In another embodiment, a system for generating virtual machines from backups of source computing platforms, including physical computing devices and/or virtual machines, and maintaining the generated virtual machines synchronized with the source computing platforms and ongoing backups thereof in preparation for failover from the source computing platforms, illustratively comprises: a source computing platform executing a first set of applications and comprising a first data agent; a primary storage device; a secondary storage device in communication with the first data agent; a destination computing platform (a) with a virtual machine configured to execute the first set of applications and (b) comprising a second data agent; wherein the first data agent is configured to: back up the source computing platform, including data that is accessed by the first set of applications, to the secondary storage device, wherein an initial full backup is followed by subsequent incremental backups that comprise only changed data blocks relative to an immediately preceding backup, and wherein the initial full backup generates a first full backup copy that comprises, in a hypervisor-independent format, one or more configuration parameters of the source computing platform. The above-recited system further comprises: wherein the second data agent is configured to: convert the one or more configuration parameters in the hypervisor-independent format obtained from the first full backup copy into a format suitable for a hypervisor executing on the destination computing platform, generate the virtual machine from the initial full backup copy based on the converted one or more configuration parameters, keep the virtual machine synchronized to the subsequent incremental backups of the source computing platform, and when detecting that the first computing platform has failed, activate the virtual machine to begin executing the first set of applications instead of the first computing platform.

In yet another embodiment, a system for generating virtual machines from backups of source computing platforms, including physical computing devices and/or virtual machines, and maintaining the generated virtual machines synchronized with the source computing platforms and ongoing backups thereof in preparation for failover from the source computing platforms, illustratively comprises: a source computing platform executing a first set of applications and comprising a first data agent; a primary storage device; a secondary storage device in communication with the first data agent; a destination computing platform (a) with a virtual machine configured to execute the first set of applications and (b) comprising a second data agent; wherein the second data agent is configured to: convert the one or more configuration parameters in the hypervisor-independent format obtained from the first full backup copy into a format suitable for a hypervisor executing on the destination computing platform, generate the virtual machine from the initial full backup copy based on the converted one or more configuration parameters, keep the virtual machine synchronized to the subsequent incremental backups of the source computing platform, and when detecting that the first computing platform has failed, activate the virtual machine to begin executing the first set of applications instead of the first computing platform. The above-recited system wherein the first data agent is configured to: back up the source computing platform, including data that is accessed by the first set of applications, to the secondary storage device, wherein an initial full backup is followed by subsequent incremental backups that comprise only changed data blocks relative to an immediately preceding backup, and wherein the initial full backup generates a first full backup copy that comprises, in a hypervisor-independent format, one or more configuration parameters of the source computing platform.

The above-recited system wherein the virtual machine begins executing the first set of applications substantially sooner than if the virtual machine were not kept synchronized to the subsequent incremental backups of the source computing platform, which would require those subsequent incremental backups to be restored to the virtual machine when it becomes necessary to activate the virtual machine to begin executing the first set of applications instead of the first computing platform. The above-recited system wherein the first computing platform is a physical computing device. The above-recited system wherein the first computing platform is a second virtual machine hosted by a second hypervisor and the one or more configuration parameters are formatted independently of the second hypervisor. The above-recited system wherein the second virtual machine executes over and is managed by a first type of hypervisor and the virtual machine at the destination computing platform executes over and is managed by a second type of hypervisor that is different from the first type of hypervisor, thereby enabling a virtual machine to stay synchronized across virtualization platforms. The above-recited system wherein the destination computing platform is implemented as a cloud resource.

Another illustrative method comprises: generating, using restored backed up data received from a second computing platform, a first virtual machine that is configured on a first computing platform, wherein the first computing platform comprises a first primary storage device that stores data accessible to the first virtual machine; and repeatedly synchronizing the data accessible to the first virtual machine with more recent backed up data received from the second computing platform, thereby enabling the first computing platform to incorporate changes in the data occurring at the second computing platform such that the first virtual machine is capable, on being activated, of taking over data processing from the second computing platform. The above-recited method wherein the synchronizing occurs on a predefined schedule. The above-recited method the synchronizing immediately follows the receiving of the backed up data from the second computing platform. The above-recited method wherein the backed up data comprises configuration information about the second computing platform sufficient to enable the first virtual machine to operate according to first operational characteristics that are compatible with second operational characteristics of the second computing platform. The above-recited method wherein the first computing platform is a cloud-based computing platform. The above-recited method wherein the second computing platform is a physical computing device, and wherein a first application that executes on the physical device also executes on the first virtual machine after the first virtual machine takes over from the second computing platform. The above-recited method wherein the second computing platform is a second virtual machine, and wherein a first application that executes on the second virtual machine also executes on the first virtual machine after the first virtual machine takes over from the second computing platform. The above-recited method wherein the first virtual machine executes over a first type of hypervisor and the second virtual machine executes over a second type of hypervisor, which is different from the first type of hypervisor. The above-recited method wherein the first virtual machine is managed by a first type of hypervisor and the second virtual machine is managed by a second type of hypervisor which is different from the first type of hypervisor.

The above-recited method wherein the first virtual machine is designated a disaster recovery site for applications that execute on the second computing platform; and wherein the first virtual machine is activated and takes over the execution of the applications after the second computing platform fails. The above-recited method further comprises: backing up data from the second computing platform to a secondary storage device by first performing a full backup from which the first virtual machine is generated; subsequently performing incremental backups of the second computing platform to the secondary storage device; wherein the synchronizing comprises overlaying the incremental backups stored in the secondary storage device to the data accessible to the first virtual machine. The above-recited method further comprises: in response to (a) detecting by the first computing platform that the second computing platform has failed and/or (b) losing communications therewith and/or (c) on demand, activating the first virtual machine, by the first computing platform, wherein the activated first virtual machine takes over data processing from the second computing platform, and wherein the data processing comprises executing one or more applications. The above-recited method wherein the first virtual machine takes over data processing from the second computing platform substantially sooner and/or results in less data processing downtime than if the data accessible to the first virtual machine were not repeatedly synchronized to the more recent backed up data, which would require the backed up data to be restored to the first virtual machine when it becomes necessary for the first virtual machine to take over. The above-recited method wherein the generating and synchronizing are performed at least in part by a data agent component of a data storage management system, and wherein the data agent is associated with the first data computing platform.

Another method comprises: backing up a first virtual machine to a first backup copy stored to a first secondary storage device, wherein the first virtual machine executes over a first hypervisor operating on a first virtual machine server, wherein the first virtual machine executes one or more applications accessing data stored in a primary storage device that is communicatively coupled with the first virtual machine server, and wherein the first backup copy comprises at least some of the data accessed by the one or more applications being executed by the first virtual machine; transmitting to a second secondary storage device only data blocks that changed in the first backup copy relative to a preceding backup copy of the first virtual machine, resulting in an incremental backup copy stored in the second secondary storage device. The above-recited method further comprises: restoring the incremental backup copy to a second virtual machine, thereby synchronizing the second virtual machine with the first backup copy, wherein the second virtual machine is configured over a second hypervisor operating on a second virtual machine server which is distinct from the first virtual machine server. The above-recited method further comprises: maintaining the second virtual machine configured in a state of readiness sufficient for the second virtual machine to be activated and take over executing the one or more applications from the first virtual machine upon a detected failure of the first virtual machine. The above-recited method wherein the restoring the incremental backup copy to the second virtual machine results in substantially reduced downtime when the second virtual machine takes over as compared to having to restore the incremental backup copy when it is necessary for the second virtual machine to take over from the first virtual machine. The above-recited method wherein the first hypervisor is of a first type and the second hypervisor is of a different type, and wherein the synchronizing of the second virtual machine with the first backup copy works across different types of hypervisors.

The above-recited method wherein the first virtual machine server is geographically remote from the second virtual machine server. The above-recited method wherein the second virtual machine server provides a cloud-based computing platform. The above-recited method wherein the second virtual machine operates as a disaster recovery platform for the first virtual machine. The above-recited method wherein the second virtual machine operates as a failover platform for the first virtual machine. The above-recited method further comprises: in response to detecting that the first virtual machine has failed, activating the second virtual machine and taking over, by the second virtual machine, the executing of the one or more applications. The above-recited method further comprises: reverse synchronizing a backup of the second virtual machine to the first virtual machine, wherein the backup of the second virtual machine comprises data changes generated by the executing of the one or more applications by the second virtual machine; and taking over, by the first virtual machine, the executing of the one or more applications after the reverse synchronizing. The above-recited method wherein the backing up is performed at least in part by a first data agent that is associated with the first virtual machine server; and wherein the restoring and maintaining are performed at least in part by a second data agent that is associated with the second virtual machine server. The above-recited method wherein the operations performed by the first data agent and second data agent enable the second virtual machine to substantially synchronize across different types of virtualization platforms to the first virtual machine. The above-recited method wherein the backing up is performed at least in part by a first data agent that is associated with the first virtual machine server; and further comprising: detecting, by a second data agent that is associated with the second virtual machine server, that a failure has occurred at the first virtual machine server; and in response to the detecting, causing, by the second data agent, the second virtual machine to be activated and to take over executing the one or more applications from the first virtual machine.

According to an illustrative embodiment a system for generating virtual machines from backups of source computing platforms, including physical computing devices and/or virtual machines, and maintaining the generated virtual machines synchronized with the source computing platforms and ongoing backups thereof in preparation for failover from the source computing platforms, comprises: a source computing platform executing a first set of applications and comprising a first data agent; a primary storage device comprising data accessed by the first set of applications; a secondary storage device in communication with the first data agent; a destination computing platform (a) with a virtual machine configured to be capable of executing the first set of applications and (b) comprising a second data agent. The above-recited system further comprises: wherein the first data agent is configured to: back up the source computing platform, including the data that is accessed by the first set of applications, to the secondary storage device, wherein an initial full backup is followed by subsequent incremental backups that comprise only changed data blocks relative to an immediately preceding backup. The above-recited system further comprises: wherein the second data agent is configured to: generate the virtual machine from the initial full backup of the source computing platform, keep the virtual machine synchronized to the subsequent incremental backups of the source computing platform, and activate the virtual machine to begin executing the first set of applications instead of the first computing platform. The above-recited system wherein the virtual machine begins executing the first set of applications substantially sooner than if the virtual machine were not kept synchronized to the subsequent incremental backups of the source computing platform, which would require those subsequent incremental backups to be restored to the virtual machine when it becomes necessary to activate the virtual machine to begin executing the first set of applications instead of the first computing platform. The above-recited system wherein the first computing platform is a physical computing device. The above-recited system wherein the first computing platform is also a virtual machine. The above-recited system wherein the virtual machine at the first computing platform executes over and/or is managed by a first type of hypervisor and the virtual machine at the destination computing platform executes over and/or is managed by a second type of hypervisor that is different from the first type of hypervisor, thereby enabling a virtual machine to stay synchronized across virtualization platforms.

The above-recited system wherein the destination computing platform is implemented as a cloud resource. The above-recited system wherein the system provides synchronization of the virtual machine at the destination computing platform against the source computing platform sufficient to enable the virtual machine to take over data processing of the first set of applications from the source computing platform on demand and/or on detecting a failure at the source computing platform. The above-recited system wherein the system provides synchronization of the virtual machine at the destination computing platform against a source computing platform sufficient to enable the virtual machine to take over data processing of the first set of applications from the source computing platform when the source computing platform loses communications with the destination computing platform. The above-recited system wherein the system provides synchronization of the virtual machine at the destination computing platform against a source computing platform sufficient to enable the virtual machine to take over data processing of the first set of applications from the source computing platform when the second data agent loses communications with and/or detects a failure at the source computing platform.

An non-transitory computer readable medium storing instructions, which when executed by at least one computing device having one or more processors and associated computer memory and operating within a second data processing platform, perform a method comprising: using backup data from a first data processing platform to create and maintain the second data processing platform, wherein the second data processing platform comprises one or more virtual machines that are configured and ready to be activated and take over data processing from the first data processing platform, wherein the one or more virtual machines await activation as a failover solution for the first data processing platform, and wherein the one or more virtual machines are configured but do not execute until activated by a data agent executing on the at least one computing device in the second data processing platform. The above-recited medium wherein the first data processing platform comprises at least one physical computing device that performs data processing and stores data to an associated primary storage device. The above-recited medium wherein the first data processing platform comprises at least one virtual machine. The above-recited medium wherein the at least one virtual machine in the first data processing platform is managed by a first type of hypervisor, and wherein the one or more virtual machines in the second data processing platform are managed by the first type of hypervisor. The above-recited medium wherein the at least one virtual machine in the first data processing platform is managed by a first type of hypervisor, and wherein the one or more virtual machines in the second data processing platform are managed by a second type of hypervisor, which is different from the first type of hypervisor.

The above-recited medium wherein the first data processing platform operates in a private data center. The above-recited medium wherein the first data processing platform operates in a public data center. The above-recited medium wherein the first data processing platform operates in a cloud-based data center. The above-recited medium wherein the second data processing platform operates in data center that is designated a disaster recovery site for the first data processing platform. The above-recited medium wherein the second data processing platform operates in a cloud-based computing environment. The above-recited medium wherein the method further comprises: activating the one or more virtual machines, by the data agent executing on the at least one computing device in the second data processing platform; and taking over data processing operations, by the activated one or more virtual machines, from the first data processing platform, based at least in part on using an incremental backup from the first data processing platform.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs. In yet other embodiments, system, methods, and/or computer-readable media may operate according to the systems and flowcharts depicted in FIGS. 2A-10 and according to the accompanying paragraphs, whether taken in whole or in part, and in any combination thereof, without limitation.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system for synchronizing a virtual machine to another virtual machine, the system comprising:
   a first virtual machine server comprising one or more processors and computer memory, wherein a first virtual machine executes over a first hypervisor operating on the first virtual machine server;
   a first data agent associated with the first virtual machine server, wherein the first data agent executes on a computing device comprising one or more processors and computer memory;
   a second data agent associated with a second virtual machine server that is distinct from the first virtual machine server, wherein the second data agent executes on a computing device comprising one or more processors and computer memory;
   wherein the first data agent is configured to generate, at least in part, a first full backup copy of the first virtual machine,
      wherein the first full backup copy is stored to a first secondary storage device, and
      wherein the first full backup copy comprises, in a hypervisor-independent format, one or more configuration parameters of the first virtual machine converted into the hypervisor-independent format by the first data agent associated with the first virtual machine server;

wherein the second data agent is configured to cause a second virtual machine, based on the one or more configuration parameters of the first virtual machine, to be configured over a second hypervisor operating on the second virtual machine server;

wherein the second data agent is further configured to: (a) obtain the one or more configuration parameters from the first full backup copy of the first virtual machine, (b) convert the one or more configuration parameters from the hypervisor-independent format into a format suitable for the second hypervisor, and (c) instruct the second virtual machine server to configure the second virtual machine according to the one or more configuration parameters converted into the format suitable for the second hypervisor;

wherein the second data agent is further configured to, at least in part, restore the first full backup copy to the second virtual machine in a native format accessible to the second virtual machine;

wherein the first data agent is further configured to generate, at least in part, successive incremental backup copies of the first virtual machine, each successive incremental copy comprising changes relative to a preceding backup copy of the first virtual machine; and wherein the second data agent is further configured to, at least in part, restore each successive incremental backup copy to the second virtual machine, thereby synchronizing the second virtual machine to the first virtual machine.

2. The system of claim 1, wherein the synchronizing of the second virtual machine to the first virtual machine makes the second virtual machine ready to operate instead of the first virtual machine, based on a most recent incremental backup copy of the first virtual machine restored to the second virtual machine.

3. The system of claim 1, wherein the first hypervisor is of a first type and the second hypervisor is of a different type; and wherein the second virtual machine is synchronized to the first virtual machine across different types of hypervisors.

4. The system of claim 1, wherein the second data agent is further configured to activate the second virtual machine in response to detecting that the first virtual machine has failed, thereby causing the second virtual machine to take over instead of the first virtual machine, based on a most recent incremental backup copy of the first virtual machine restored to the second virtual machine.

5. The system of claim 1, wherein the first data agent and a first media agent associated with the first secondary storage device are configured to generate the first full backup copy and the successive incremental backup copies; and wherein the second data agent and a second media agent distinct from the first media agent are configured to restore the first full backup copy and each successive incremental backup copy.

6. The system of claim 5, wherein the first media agent is further configured to consolidate a plurality of the incremental backup copies into a consolidated copy that is transmitted to the second media agent; and wherein the incremental backup copies in the plurality are restored to the second virtual machine from the consolidated copy.

7. The system of claim 1, wherein the first data agent and a first media agent associated with the first secondary storage device are configured to generate the first full backup copy and the successive incremental backup copies; and wherein the second data agent and a second media agent distinct from the first media agent are configured to restore the first full backup copy and each successive incremental backup copy; and when the second media agent detects that restoring a first incremental backup copy has failed more than a threshold number of times, the second media agent is configured to: in conjunction with the second data agent, (i) restore a second incremental backup copy, which is older than the first incremental backup copy, to the second virtual machine, and (ii) block any further restore operations to the second virtual machine.

8. The system of claim 1, wherein the second data agent is further configured to detect that a failure has occurred at the first virtual machine server, and to cause the second virtual machine to be activated and to take over instead of the first virtual machine, based on a most recent incremental backup copy of the first virtual machine restored to the second virtual machine.

9. The system of claim 1, wherein the first data agent is further configured to transmit the first full backup copy to a media agent, which stores the first full backup copy to a second secondary storage device, and to further transmit each successive incremental backup copy to the media agent, which stores each successive incremental backup copy to the second secondary storage device.

10. The system of claim 1 wherein the second virtual machine server is implemented in a cloud-based computing platform for the second virtual machine.

11. The system of claim 1, wherein the first data agent and a first media agent associated with the first secondary storage device are configured to generate the first full backup copy and the successive incremental backup copies; and wherein the second data agent and the first media agent are configured to restore the first full backup copy and each successive incremental backup copy.

12. The system of claim 1, wherein the second virtual machine server is implemented as a cloud computing resource.

13. A system for synchronizing a virtual machine to another virtual machine, the system comprising:

a first virtual machine server comprising one or more processors and computer memory, wherein a first virtual machine executes over a first hypervisor operating on the first virtual machine server;

a first data agent associated with the first virtual machine server, wherein the first data agent executes on a computing device comprising one or more processors and computer memory;

a second data agent associated with a second virtual machine server that is distinct from the first virtual machine server, wherein the second data agent executes on a computing device comprising one or more processors and computer memory;

wherein the first data agent is configured to generate in conjunction with a first media agent a first full backup copy of the first virtual machine, wherein the first full backup copy is stored by the first media agent to a first secondary storage device, and wherein the first full backup copy comprises, in a hypervisor-independent format, one or more configuration parameters of the first virtual machine converted into the hypervisor-independent format by the first data agent;

wherein the second data agent is configured to cause a second virtual machine, based on the one or more configuration parameters, to be configured over a second hypervisor operating on the second virtual machine server;

wherein the second data agent is further configured to: (a) obtain the one or more configuration parameters from the first full backup copy of the first virtual machine, (b) convert the one or more configuration parameters from the hypervisor-independent format into a format suitable for the second hypervisor, and (c) instruct the second virtual machine server to configure the second virtual machine according to the converted one or more configuration parameters;

wherein the first data agent is further configured to generate in conjunction with the first media agent successive incremental backup copies of the first virtual machine, each successive incremental copy comprising changes relative to a preceding backup copy of the first virtual machine;

wherein the second data agent is further configured to in conjunction with a media agent restore the first full backup copy to the second virtual machine in a native format accessible to the second virtual machine; and wherein the second data agent is further configured to in conjunction with a media agent restore each successive incremental backup copy to the second virtual machine, thereby making the second virtual machine ready to operate instead of the first virtual machine based on a most recent incremental backup copy of the first virtual machine restored to the second virtual machine.

14. The system of claim 13, wherein the restore of each successive incremental backup copy to the second virtual machine synchronizes the second virtual machine to the first virtual machine.

15. The system of claim 13, wherein the first hypervisor is of a first type and the second hypervisor is of a different type; and wherein the restore of each successive incremental backup copy to the second virtual machine synchronizes the second virtual machine to the first virtual machine across different types of hypervisors.

16. The system of claim 13, wherein the media agent that operates in conjunction with the second data agent is the first media agent that also operates in conjunction with the first data agent.

17. The system of claim 13, wherein the media agent that operates in conjunction with the second data agent is distinct from the first media agent that operates in conjunction with the first data agent.

18. The system of claim 13, wherein the second data agent is further configured to: activate the second virtual machine in response to detecting that the first virtual machine has failed, thereby causing the second virtual machine to take over instead of the first virtual machine, based on the most recent incremental backup copy of the first virtual machine restored to the second virtual machine.

19. The system of claim 13, wherein the second virtual machine server is implemented as a cloud computing resource.

* * * * *